(12) United States Patent
Kollberg et al.

(10) Patent No.: US 12,583,792 B2
(45) Date of Patent: Mar. 24, 2026

(54) CEMENT ADDITIVES FOR RAPID STRENGTH DEVELOPMENT

(71) Applicant: CemVision AB, Stockholm (SE)

(72) Inventors: Claes Göran Kollberg, Mörbylånga (SE); Paul Johan Sandberg, Nokomis, FL (US)

(73) Assignee: CemVision AB, Stockholm (SE)

( * ) Notice: Subject to any disclaimer, the term of this patent is extended or adjusted under 35 U.S.C. 154(b) by 0 days.

(21) Appl. No.: 19/224,372

(22) Filed: May 30, 2025

(65) Prior Publication Data

US 2025/0289760 A1      Sep. 18, 2025

Related U.S. Application Data

(63) Continuation of application No. PCT/SE2025/050091, filed on Feb. 6, 2025.
(Continued)

(30) Foreign Application Priority Data

Feb. 6, 2025    (WO) ................. PCT/SE2025/050091

(51) Int. Cl.
  *C04B 28/14*          (2006.01)
  *C04B 14/06*          (2006.01)
  (Continued)

(52) U.S. Cl.
  CPC .............. *C04B 28/14* (2013.01); *C04B 14/06* (2013.01); *C04B 22/0093* (2013.01);
  (Continued)

(58) Field of Classification Search
  CPC ..... C04B 28/14; C04B 14/06; C04B 22/0093; C04B 22/085; C04B 24/06; C04B 2103/10; C04B 2201/50
  See application file for complete search history.

(56) References Cited

U.S. PATENT DOCUMENTS

2021/0238094 A1* 8/2021 Frouin ................. C04B 22/147

FOREIGN PATENT DOCUMENTS

AU         784843 B2     7/2006
CN       108083671 A     5/2018
(Continued)

OTHER PUBLICATIONS

Jacob, Liya, "Ladle Furnace Slag: Synthesis, Properties, and Applications", ChemBioEng Reviews, vol. 11, pp. 60-78, <https://onlinelibrary.wiley.com/doi/full/10.1002/cben.202300024>. (Year: 2023).*

(Continued)

*Primary Examiner* — Amber R Orlando
*Assistant Examiner* — Sarah Catherine Case
(74) *Attorney, Agent, or Firm* — Davis Wright Tremaine LLP

(57) ABSTRACT

Systems and methods are provided for a forming a supersulfated cementitious material. In one embodiment, the supersulfated cementitious material may include a ladle slag and one or more sulfates obtained from various industrial sulfurization processes. The supersulfated cementitious material may further include one or more supplementary cementitious materials (SCMs). An amount of ground granulated blast furnace slag incorporated into the supersulfated cementitious material may be less than 82% while demonstrating rapid strength development.

23 Claims, 10 Drawing Sheets

Related U.S. Application Data

(60) Provisional application No. 63/550,513, filed on Feb. 6, 2024.

(51) Int. Cl.

| | | |
|---|---|---|
| *C04B 22/00* | (2006.01) | |
| *C04B 22/08* | (2006.01) | |
| *C04B 24/06* | (2006.01) | |
| *C04B 103/10* | (2006.01) | |

(52) U.S. Cl.
CPC ............ *C04B 22/085* (2013.01); *C04B 24/06* (2013.01); *C04B 2103/10* (2013.01); *C04B 2201/50* (2013.01)

(56) References Cited

FOREIGN PATENT DOCUMENTS

| | | | |
|---|---|---|---|
| CN | 107827379 B | 12/2020 | |
| EP | 4438575 A1 | 10/2024 | |
| WO | 2022122343 A1 | 6/2022 | |
| WO | WO-2022238376 A1 * | 11/2022 | ........... C04B 28/082 |
| WO | 2023118661 A1 | 6/2023 | |

OTHER PUBLICATIONS

Wang, et al., "A new perspective on Belite-ye'elimite-ferrite cement manufactured from electrolytic manganese residue: Production, properties, and environmental analysis", Cement and Concrete Research, vol. 163, p. 1-2. (Year: 2022).*

International Searching Authority, "Search Report" in International Patent Application No. PCT/SE2025/050091, Mar. 7, 2025, 12 pages.

* cited by examiner

Reactive Material 106

Sulfate(s) 108

1st Additional Activator(s) 110

SCM(s) 112

104

Crushing Plant 102

Kiln 114

105

103

Mill 116

2nd Additional Activator(s) 118

Separator 120

Product(s) 122

CEMENT ADDITIVES FOR RAPID STRENGTH DEVELOPMENT

CROSS-REFERENCE TO RELATED APPLICATIONS

This application is a continuation of International Patent Application No. PCT/SE2025/050091, entitled "CEMENT ADDITIVES FOR RAPID STRENGTH DEVELOPMENT" and filed on Feb. 6, 2025, which claims priority to U.S. Provisional Patent Application No. 63/550,513, entitled "CEMENT ADDITIVES FOR RAPID STRENGTH DEVELOPMENT" and filed on Feb. 6, 2024. The entire contents of each of the above-identified applications are hereby incorporated by reference for all purposes.

FIELD

Embodiments of the subject matter disclosed herein relate to cementitious materials and processes for forming cement for concrete components, and more particularly to additives for supersulfated cements.

BACKGROUND

Cement is widely used in construction and its production relies on a combination of minerals. As construction relying on concrete components is increasing globally, consumption of cement has accelerated over recent years. The production of cement, however, releases carbon dioxide. It is therefore desirable to shift industrial cement production to favor more environmentally-friendly types of cement, such as supersulfated cements (SSCs).

SSCs may be composed of greater than 75% of industrial solid waste materials, such as ground granulated blast furnace (GGBF) slag, thereby decreasing adverse environmental effects associated with disposal of such materials. Further, manufacturing of SSCs may have a lower carbon footprint than manufacturing of conventional cementitious materials for construction applications. While the SSCs present a more environmentally sustainable option over conventional cementitious materials, the SSCs suffer from slow early strength development when used as a binder in concrete. Moreover, as iron manufacturing is shifting from use of blast furnaces to electrical methods, availability of GGBF slag may constrain current methods for SSC production.

SUMMARY

According to a first aspect of the disclosure, a supersulfated cementitious material comprises:
(i) a hydraulic activator comprising calcium (Ca) and aluminum (Al), wherein the calcium content, expressed as CaO equivalent, is at least 20% by weight; and the aluminum content, expressed as $Al_2O_3$ equivalent, is at least 15% by weight;
(ii) one or more sulfates; and
(iii) one or more supplementary cementitious materials (SCMs). This composition leverages industrial byproducts and optimizes material properties for sustainable construction practices.
Optionally in some examples, the hydraulic activator is selected from the group consisting of: a ladle slag, an amorphous alumina slag, a Belite-Ye'elimite-Ferrite (BYF)

clinker, and a combination thereof. This selection expands the range of suitable hydraulic activators for diverse applications.

Optionally in some examples, the one or more SCMs have a reactivity of at least 100 J/g when measured according to ASTM C1897 at 40° C. over a period of 7 days. This reactivity threshold ensures adequate performance and strength development.

Optionally in some examples, the one or more sulfates is obtained from one or more industrial desulfurization processes. This sourcing strategy promotes waste utilization and reduces reliance on natural resources.

Optionally in some examples, the supersulfated cementitious material comprises at least 5 wt % of the hydraulic activator, such as 5 wt % of the activator, such as 13 wt % of the activator, such as 13.4 wt % of the activator, such as 15 wt % of the activator, such as 20 wt % of the activator. This activator proportion contributes to the desired material properties and performance characteristics.

Optionally in some examples, the supersulfated cementitious material comprises at least 0.5 wt % of the one or more sulfates. This sulfate content ensures proper hydration and hardening of the material.

Optionally in some examples, the supersulfated cementitious material comprises at least 13 wt % of the hydraulic activator. This higher activator content may further enhance material properties and performance.

Optionally in some examples, the supersulfated cementitious material comprises at least 1 wt % of the one or more sulfates. This increased sulfate content may further optimize hydration and hardening processes.

Optionally in some examples, the supersulfated cementitious material comprises 90% or less of the SCMs. This limit on SCM content helps balance material properties and cost-effectiveness.

Optionally in some examples, the supersulfated cementitious material comprises between 5 wt % and 20 wt % of the hydraulic activator, such as between 5 wt % and 15 wt % of the activator, such as between 5 wt % and 13.5 wt % of the activator. This activator range provides flexibility in material design and optimization.

Optionally in some examples, the supersulfated cementitious material comprises 20 wt % or less of the hydraulic activator, such as 15 wt % or less of the activator, such as 5% of the activator. This upper limit on activator content helps control material cost and workability.

Optionally in some examples, the one or more SCMs comprise ground granulated blast furnace (GGBF) slag. This SCM choice enhances material sustainability and performance.

Optionally in some examples, the supersulfated cementitious material comprises 82 wt % or less of the GGBF slag. This limit on GGBF slag content helps balance material properties and cost.

Optionally in some examples, the supersulfated cementitious material comprises 76.5 wt % or less of the GGBF slag. This refined limit on GGBF slag content allows for further optimization of material properties.

Optionally in some examples, the supersulfated cementitious material comprises 67 wt % or less of the GGBF slag. This specific limit on GGBF slag content offers further flexibility in material design.

Optionally in some examples, the one or more SCMs comprise calcined clay. This SCM option further promotes material sustainability and resource efficiency.

Optionally in some examples, the supersulfated cementitious material comprises 65 wt % or less of the calcined clay.

This limit on calcined clay content helps balance material properties and cost-effectiveness.

Optionally in some examples, the supersulfated cementitious material further comprises quicklime (CaO). The addition of quicklime can enhance early-age strength development.

Optionally in some examples, the supersulfated cementitious material comprises 5% wt or less of quicklime (CaO). This controlled amount of quicklime helps prevent excessive heat generation and maintains workability.

Optionally in some examples, the supersulfated cementitious material further comprises Portland cement clinker. The inclusion of Portland cement clinker can improve early strength development and overall performance.

Optionally in some examples, the supersulfated cementitious material comprises 5 wt % or less of Portland cement clinker. This limited use of Portland cement clinker minimizes the environmental impact while still contributing to the material's properties.

Optionally in some examples, the supersulfated cementitious material further comprises natural gypsum. Natural gypsum can provide additional sulfate ions for enhanced hydration and strength development.

Optionally in some examples, the supersulfated cementitious material further comprises 16 wt % or less of natural gypsum. This controlled amount of natural gypsum optimizes sulfate content and prevents excessive expansion.

Optionally in some examples, the hydraulic activator replaces at least a portion of the portland cement clinker in the supersulfated cementitious material. This substitution reduces reliance on portland cement and promotes the use of industrial byproducts, thereby enhancing sustainability.

Optionally in some examples, the one or more sulfates replaces at least a portion of the natural gypsum in the supersulfated cementitious material. This substitution reduces reliance on natural resources and promotes the use of industrial byproducts.

Optionally in some examples, the supersulfated cementitious material further comprises a calcium sulfoaluminate clinker. The addition of calcium sulfoaluminate clinker can enhance the performance and properties of the material.

Optionally in some examples, the calcium sulfoaluminate clinker is a Belite-Ye'elimite-Ferrite (BYF) clinker. Using BYF clinker can provide specific advantages in terms of strength development and durability.

Optionally in some examples, the supersulfated cementitious material comprises at least 0.5 wt % of Belite-Ye'elimite-Ferrite (BYF) clinker, such as 1 wt %, such as 5 wt %, such as 15 wt %. This range of BYF clinker content allows for optimization of material properties and cost-effectiveness.

Optionally in some examples, the supersulfated cementitious material comprises between 0.5 wt % and 5 wt % of the Belite-Ye'elimite-Ferrite (BYF) clinker, such as between 0.5 wt % and 3 wt %. This specific range of BYF clinker content offers further control over material properties and workability.

Optionally in some examples, the supersulfated cementitious material further comprises 5 wt % of the Belite-Ye'elimite-Ferrite (BYF) clinker. This specific amount of BYF clinker can provide a balance between performance and cost.

Optionally in some examples, the supersulfated cementitious material further comprises one or more chemical additives. The inclusion of chemical additives can enhance specific properties of the material, such as setting time, workability, and durability.

Optionally in some examples, the one or more chemical additives comprise one or more compounds selected from: calcium nitrate, calcium nitrite, alkali salts, alkaline earth salts, retarders, clay, cement kiln dust and any combinations thereof. This selection of chemical additives offers a wide range of options for tailoring the material's properties to specific application requirements.

Optionally in some examples, the one or more chemical additives comprise one or more chelating agents. This inclusion further refines the control over the chemical reactions and material properties.

Optionally in some examples, the one or more ion chelating agents comprise compounds selected from: alkanolamines, hydroxycarboxylic acids, gluconates and derivatives thereof. This selection offers specific control over ion complexation and material behavior.

Optionally in some examples, the one or more ion chelating agents are selected from the group consisting of: tartaric acid, citric acid, gluconic acid, lactic acid, malic acid, phosphoric acid, and a combination thereof. This specific selection provides a range of options for optimizing chelation effects and material performance.

Optionally in some examples, the one or more chemical additives comprise one or more compounds capable of providing calcium ions in aqueous solution. This inclusion can influence the hydration and setting behavior of the material.

Optionally in some examples, the one or more compounds capable of providing calcium ions in aqueous solution comprise calcium salts. This choice provides a readily available source of calcium ions for influencing material properties.

Optionally in some examples, the one or more compounds capable of providing calcium ions in aqueous solution are selected from the group consisting of: calcium nitrate, calcium nitrite, calcium chloride, calcium bromide, calcium iodide, calcium acetate, calcium formate, calcium gluconate, calcium lactate and calcium propionate. This selection offers a variety of calcium salts for optimizing calcium ion availability and material performance.

Optionally in some examples, the one or more chemical additives comprise sodium salts. The presence of sodium salts can influence the setting time and strength development of the material.

Optionally in some examples, the one or more chemical additives comprise potassium salts. The inclusion of potassium salts can affect the setting behavior and strength gain of the material.

According to another aspect of the disclosure, a method for manufacturing a supersulfated cementitious material comprises heating and/or grinding a mixture comprising a precursor to a pozzolanic material at least partially formed of aluminosilicates, an hydraulic activator comprising calcium (Ca) and aluminum (Al), wherein the calcium content, expressed as CaO equivalent, is at least 20% by weight; and the aluminum content, expressed as $Al_2O_3$ equivalent, is at least 15% by weight, and one or more sulfates; and adding one or more chemical additives to the mixture after the grinding. This method leverages industrial byproducts and optimizes material properties for sustainable construction practices.

Optionally in some examples, the one or more sulfates is obtained from one or more industrial desulfurization processes. This sourcing strategy promotes waste utilization and reduces reliance on natural resources.

Optionally in some examples, adding the one or more chemical additives comprises adding one or more compounds capable of providing calcium ions in aqueous solution. This inclusion can influence the hydration and setting behavior of the material.

Optionally in some examples, adding the one or more chemical additives comprises adding one or more compounds selected from: cement kiln dust, ladle slag, Belite-Ye'elimite-Ferrite (BYF) clinker and ion chelating agent. This selection of chemical additives offers a wide range of options for tailoring the material's properties to specific application requirements.

Optionally in some examples, the ion chelating agent comprises a compound selected from: alkanolamines, hydroxycarboxylic acids, gluconates and derivatives thereof. This selection offers specific control over ion complexation and material behavior.

Optionally in some examples, the supersulfated cementitious material conforms to European cement specification EN 15743:2010+Al: 2015. This ensures standardized quality and performance.

Optionally in some examples, the method further comprises adding between 5 wt % to 30 wt % of ground limestone to the mixture. This addition can enhance certain material properties and reduce cost.

Optionally in some examples, the method further comprises adding between 5 wt % to 30 wt % coal combustion fly ash to the mixture. This inclusion promotes waste utilization and can improve material properties.

According to another aspect of the disclosure, a supersulfated cement binder comprises less than 82 wt % of granulated blast furnace slag, at least 5 wt % of ladle slag, and at least 0.5 wt % of sulfates obtained from one or more industrial desulfurization processes. This composition utilizes industrial byproducts for a more sustainable binder system.

Optionally in some examples, the supersulfated cement binder further comprises ground limestone. This addition can enhance certain material properties and reduce cost.

Optionally in some examples, the supersulfated cement binder comprises between 5 wt % to 30 wt % of ground limestone. This specified range allows for optimization of material properties and cost-effectiveness.

Optionally in some examples, the supersulfated cement binder further comprises coal combustion fly ash. This inclusion promotes waste utilization and can improve material properties.

Optionally in some examples, the supersulfated cement binder comprises between 5 wt % to 30 wt % of coal combustion fly ash. This specified range allows for further optimization of material properties and waste utilization.

Optionally in some examples, the supersulfated cement binder has a compressive strength of at least 9.5 MPa at one day after mixing with water. This ensures early strength development for faster construction processes.

Optionally in some examples, the supersulfated cement binder further comprises calcium nitrate, and the binder comprising calcium nitrate has a compressive strength of at least 22.4 MPa at one day after formation. This further enhances early strength development, enabling quicker setting times.

Optionally in some examples, the supersulfated cement binder has a compressive strength of at least 48 MPa at 28 days after formation. This ensures long-term strength and durability of the binder.

Optionally in some examples, the supersulfated cement binder further comprises a retarder, and the retarder comprises one or more compounds selected from: tartaric acid, borates, and sugar derivatives. This inclusion allows for controlled setting time and improved workability.

According to another aspect of the disclosure, a supersulfated cement binder comprises less than 82 wt % of granulated blast furnace slag, at least 5 wt % of amorphous alumina slag, and at least 0.5 wt % of sulfates obtained from one or more industrial desulfurization processes. This composition utilizes industrial byproducts for a more sustainable binder system.

Optionally in some examples, the supersulfated cement binder further comprises ground limestone. This addition can enhance certain material properties and reduce cost.

Optionally in some examples, the supersulfated cement binder comprises between 5 wt % to 30 wt % of ground limestone. This range allows for optimizing material properties and cost-effectiveness.

Optionally in some examples, the supersulfated cement binder further comprises coal combustion fly ash. This inclusion promotes waste utilization and can improve material properties.

Optionally in some examples, the supersulfated cement binder comprises between 5 wt % to 30 wt % of coal combustion fly ash. This range allows for further optimization of material properties and waste utilization.

Optionally in some examples, the supersulfated cement binder has a compressive strength of at least 8.8 MPa at one day after mixing with water. This ensures early strength development for faster construction processes.

Optionally in some examples, the supersulfated cement binder further comprises calcium nitrate, and the binder comprising the calcium nitrate has a compressive strength of at least 9.4 MPa at one day after formation. This further enhances early strength development, enabling quicker setting times.

Optionally in some examples, the supersulfated cement binder has a compressive strength of at least 50.4 MPa at 28 days after formation. This ensures long-term strength and durability for various applications.

Optionally in some examples, the supersulfated cement binder further comprises a retarder, and the retarder comprises one or more compounds selected from: tartaric acid, borates, and sugar derivatives. This allows for controlled setting time and improved workability, facilitating easier application and placement.

BRIEF DESCRIPTION OF THE DRAWINGS

Various embodiments and techniques will be described with reference to the drawings, in which.

DETAILED DESCRIPTION

Figure 1:
FIG. 1 shows a simplified process for forming a cementitious material, according to an embodiment of the present disclosure.

SSCs are a type of cementitious material that, when used to replace conventional cementitious materials (e.g., ordinary Portland cement (OPC)) used in binders for concrete mixtures, may at least partially alleviate an environmental burden imposed by cement manufacturing. For example, SSCs may include at least 75% (with respect to weight) of industrial waste materials such as GGBF slag, thus increasing reuse and recycling of industrial byproducts. In addition, because SSCs incorporate industrial waste products into their composition instead of carbon-containing minerals such as limestone, release of carbon during processing of the SSC raw materials may be reduced compared to processing of conventional cement binders.

Shifting production of cementitious materials towards SSCs over conventional cement binders presents several challenges, however. As one example, SSCs may be prone to poor early strength development when used as a concrete binder, leading to long hardening times and delays during constructions events and operations. Additionally, as iron and steelmaking industries transition away from using blast furnaces, GGBF slag may become more difficult to obtain. Further, SSCs may utilize Portland cement and a virgin source of calcium sulfate (CaSO4), such as natural gypsum or anhydrite, as activators to initiate hardening of the SSC. Acquisition and processing of each of these activators is associated with carbon emissions and/or environmentally-detrimental effects. As a result of these issues, applications for which SSCs are deemed suitable may be constrained unless remedial approaches are established.

As used herein, 'Portland cement' refers to a hydraulic cement comprising ground Portland cement clinker and calcium sulfate (typically gypsum), as well as other minor additional constituents.

As used herein, 'Portland cement clinker' refers to a hydraulic material comprising predominantly calcium silicates ($C_3S$ and $C_2S$), calcium aluminates ($C_3A$), and calcium aluminoferrite ($C_4AF$), produced by sintering or fusing a precisely proportioned mixture of primarily calcium oxide (CaO) and silicon dioxide ($SiO_2$) with smaller amounts of aluminum oxide ($Al_2O_3$), iron oxide ($Fe_2O_3$), and other raw materials. 'Portland cement clinker' shall be understood to include both Portland cement clinker in its pure form and Portland cement clinker as a constituent of Portland cement.

As used herein, 'virgin source of calcium sulfate ($CaSO_4$)' refers to naturally occurring forms of calcium sulfate, either as gypsum ($CaSO_4 \cdot 2H_2O$, calcium sulfate dihydrate, also referred to herein as natural gypsum) or calcium sulfate natural anhydrite ($CaSO_4$), extracted from geological deposits rather than obtained from industrial processes or by-products.

As used herein, the term '% by weight' or 'wt %' refers to the mass of a component relative to the total mass of the composition, expressed as a percentage.

Supersulfated cements are known in the art to comprise one or more hydraulic activators rich in calcium; however, the inventors have surprisingly discovered that utilizing hydraulic activators comprising mixtures rich in both calcium and aluminum, capable of releasing both calcium and aluminate ions in solution, provides unexpected improvements in cement performance. In at least one embodiment, a rich in calcium and aluminum supersulfated cementitious material may include a hydraulic activator rich in calcium (Ca) and aluminum (Al). As used herein, the term rich in calcium and aluminum refers to materials characterized by >20% by weight of calcium content, expressed as CaO equivalent; and >15% by weight aluminum content, expressed as $Al_2O_3$ equivalent. In some instances, a hydraulic activator rich in calcium (Ca) and aluminum (Al) is referred to as hydraulically reactive material.

In certain embodiments, the hydraulic activator may comprise a mixture of two or more compounds, wherein the cumulative calcium content of the mixture, expressed as CaO equivalent, exceeds 20% by weight of the total mixture, and the cumulative aluminum content of the mixture, expressed as $Al_2O_3$ equivalent, exceeds 15% by weight of the total mixture. Such mixtures may be formulated to achieve the desired calcium and aluminum content thresholds through the combined contribution of the individual compounds comprising the mixture.

As used herein, the term 'hydraulically reactive material' refers to material rich in calcium (Ca) and/or aluminum (Al), wherein calcium and alumina-containing compounds are capable of reacting with water to release calcium and aluminate ions to activate the cementitious reaction. Suitable examples of hydraulic activators rich in both calcium and aluminum include but not limited to ladle slags, amorphous alumina slags, and Belite-Ye'elimite-Ferrite (BYF) clinkers. In at least one other embodiment, the supersulfated cementitious material may further comprise one or more sulfates. In at least one other embodiment a supersulfated cementitious material may comprise one or more sulfates obtained from one or more industrial desulfurization processes. As used herein, the term 'desulfurization process' refers to any chemical, physical, thermal, or combined treatment process for removing sulfur or sulfur-containing compounds from a material, wherein said process generates sulfates as products or by-products. The term encompasses, but is not limited to: (i) the removal of sulfur from mineral ores during metallurgical processing; (ii) the reduction of sulfur content in petroleum products and crude oil; (iii) the elimination of sulfur compounds during fertilizer manufacturing; (iv) hydrometallurgical and pyrometallurgical methods for sulfur removal; (v) hydrodesulfurization reactions; and (vi) biological desulfurization treatments. The cementitious material may further include one or more supplementary cementitious materials (SCMs). SCMs are materials that can partially substitute cement in cementitious mixtures. The substitution may happen either at the cement manufacturing stage, e.g., SCMs are used to replace cement clinker to create a blended cement. Alternatively, the substitution may happen at end use thereof, e.g., SCMs are used to replace cement during, as one example, concrete mixing. Conventionally, SCM's may be derived from both industrial byproducts, such as combustion ashes (eg. fly ash) and rapidly cooled metallurgical slags from processing of iron ore to manufacture steel (eg. granulated blast furnace slag), steel (eg. electric arc furnace (EAF) slag and basic oxygen furnace (BOF) slag, slag from DRI), and copper (eg. granulated copper slag) production, and from natural sources such as volcano ashes, activated clays and limestone. SCMs derived from industrial byproducts may include residuals rich in calcium such as cement kiln dust; calcium carbide; residuals rich in calcium hydroxide or burned lime from the paper and pulp industry, such as combusted recycled paper produced with limestone filler; residuals rich in calcium hydroxide from the sugar industry. Most SCMs are natural pozzolans and/or hydraulic materials that act as pozzolans, e.g., where the SCM reacts with calcium to form cementing hydrates such as calcium silicate hydrates, calcium sulfoaluminate hydrates. Some SCMs such as limestone can react with aluminates to form calcium aluminate carbonate hydrates. Additionally, certain SCMs possess the capability to function as chemical or physical activators within cementitious systems, wherein they can promote or catalyze the reactivity of other constituents in the mixture through mechanisms including, but not limited to, the provision of soluble species, pH modification, or enhancement of nucleation and growth processes. Such materials may simultaneously act as both reactive components and activating agents within the same system. In at least one other embodiment, the supersulfated cementitious material may comprise a SCM with a reactivity of at least 100 J/g when measured according to ASTM C1897 at 40° C. over a period of 7 days.

In at least one embodiment, a supersulfated cementitious material may include a hydraulic activator rich in calcium (Ca) and aluminum (Al) is characterized by the calcium content, expressed as CaO equivalent, of at least 20 wt %, such as at least 30 wt %, such as at least 35 wt %.

In at least one embodiment, a supersulfated cementitious material may include a hydraulic activator rich in calcium (Ca) and aluminum (Al) is characterized by the aluminum content, expressed as $Al_2O_3$, of at least 15 wt %, such as at least 20 wt %, such as at least 30 wt %, such as at least 35 wt %.

In at least one embodiment, a supersulfated cementitious material may include a hydraulic activator rich in calcium (Ca) and aluminum (Al) is characterized by the calcium content, expressed as CaO equivalent, and aluminum content, expressed as $Al_2O_3$ equivalent.

In at least one other embodiment, a hydraulic activator comprises calcium (Ca) and aluminum (Al), wherein:

the calcium content, expressed as CaO equivalent, is at least 20 wt %; and the aluminum content, expressed as $Al_2O_3$ equivalent, is at least 15 wt %.

In at least one other embodiment, a hydraulic activator comprises calcium (Ca) and aluminum (Al), wherein:

the calcium content, expressed as CaO equivalent, is at least 25 wt %; and the aluminum content, expressed as $Al_2O_3$ equivalent, is at least 15 wt %.

In at least one other embodiment, a hydraulic activator comprises calcium (Ca) and aluminum (Al), wherein:

the calcium content, expressed as CaO equivalent, is at least 25 wt %; and the aluminum content, expressed as $Al_2O_3$ equivalent, is at least 20 wt %.

In at least one other embodiment, a hydraulic activator comprises calcium (Ca) and aluminum (Al), wherein:

the calcium content, expressed as CaO equivalent, is at least 30 wt %; and the aluminum content, expressed as $Al_2O_3$ equivalent, is at least 25 wt %.

In at least one other embodiment, a method for manufacturing a supersulfated cementitious material may include heating and grinding a mixture comprising natural clay like materials and/or industrial wastes containing alumina and/or silica, (e.g., >10% by weight calculated as aluminum oxide ($Al_2O_3$), as a component). In at least one other embodiment, the natural clay like materials and/or industrial wastes containing alumina and/or silica may partially or fully replace the need for blast furnace slag or other steel slags. In at least one other embodiment the natural clay like materials and/or industrial wastes containing alumina and/or silica comprise a precursor to a pozzolanic material at least partially formed of aluminosilicates. Suitable precursors to a pozzolanic material include, but not limited to calcium-rich calcinable material such as low grade limestone or dolomite. In at least one other embodiment, the natural clay like materials and/or industrial wastes containing alumina and/or silica comprise an industrial waste rich in alumina hydroxide such as red mud and other slags from alumina manufacture rich in alumina hydroxide. In at least one other embodiment the mixture may further comprise an activator rich in calcium that becomes reactive after calcination at temperatures below 1100 C, that optionally has also reactive alumina after said calcination.

Furthermore, the traditional use of natural calcium sulfates can be partially or fully replaced with one or more sulfates obtained from industrial desulfurization processes. The method may further include adding one or more chemical additives to the cementitious material after the grinding.

In at least one other embodiment, a method for manufacturing a supersulfated cementitious material may include heating and grinding a mixture comprising natural clay like materials and/or industrial wastes containing alumina and/or silica, a hydraulic activator, and one or more sulfates. In at least one other embodiment, the method further comprises adding one or more chemical additives to the mixture after the grinding.

In at least one other embodiment, a supersulfated cement binder may include less than 82 wt % of GGBF slag, at least 5 wt % of ladle slag, and at least 0.5 wt % of sulfates obtained from one or more industrial desulfurization processes. The supersulfated cement binder may further include one or more of ground limestone and coal combustion fly ash.

In at least one other embodiment, a supersulfated cement binder may include less than 82 wt % of GGBF slag, at least 5 wt % of amorphous alumina slag, and at least 0.5 wt % of sulfates obtained from one or more industrial desulfurization processes. The supersulfated cement binder may further include one or more of ground limestone and coal combustion fly ash.

In at least one other embodiment, a supersulfated cement binder may include less than 76.5 wt % of GGBF slag, at least 5 wt % of amorphous alumina slag, and at least 0.5 wt % of sulfates obtained from one or more industrial desulfurization processes. The supersulfated cement binder may further include one or more of ground limestone and coal combustion fly ash.

As described herein, a supersulfated cementitious material having increased early strength development may be composed of a metallurgical slag including, but not limited, to blast furnace slag; a carrier of alumina, such as, but not limited to, aluminosilicate clays, alumina dross or other industrial waste rich in alumina; a carrier of reactive calcium including but not limited to ladle slags; and a sulfate carrier, such as sulfates from desulfurization processes (e.g., desulfurization sulfates), and other chemical additives (also referred to herein as activators or chemical activators), including but not limited to calcium nitrate. This composition of the supersulfated cementitious material may allow an amount of GGBF slag and natural sulfate (e.g., new or virgin gypsum; calcium sulfate natural anhydrite) that is incorporated therein to be reduced. The supersulfated cementitious material may also be manufactured with a lower carbon footprint due to substitution of activators, such as Portland cement clinker and natural gypsum, with the activator rich in calcium (Ca) and aluminum (Al) and desulfurization sulfates, respectively. Moreover, components and constituents of the supersulfated cementitious material may also include one or more precursors to pozzolanic materials. The manufacturing carbon footprint may be further decreased by adding carbon-containing compounds, such as limestone and/or coal combustion fly ash, which may contribute to the overall cementitious binder hydration, and also effectively sequester carbon into the resulting concrete construction materials.

In at least one embodiment, the supersulfated cementitious material described herein may incorporate raw materials, such as precursors to pozzolanic materials, that provide reactive calcium (Ca), aluminum (Al), sulfate ($SO_4$), and silicon (Si) to generate cementitious hydration products based on calcium aluminate sulfate hydrates and calcium silicate hydrates. The raw materials may at least partially substitute conventional raw materials such as GGBF slag, calcium sulfate natural anhydrite, and Portland cement clinker provided the substitute raw materials have sufficient reactivity. Raw material reactivity may depend on a combination of chemistry, mineralogy, and particle size (e.g., fineness), as described below. The reactivity of the raw material may guide development of screening methods for suitable materials and production of cementitious materials with desirable properties. For example, development of methods for screening and production may include evaluating whether processes such as calcination are demanded and/or how the materials are to be ground.

With respect to chemistry, the more reactive Al present in a material, where the material may be, at least in one embodiment, an amorphous material, the more suitable a raw material may be for forming a cement binder, up to a limit where the amount of ettringite, a calcium sulfa-aluminate hydrate, is optimum for the rate of compressive strength development. In other embodiments, however, formulations of GGBF slag with low Al content in combination with other components, such as ladle slag and chemical activators, may perform similarly. Although high Al may be desirable, formation of crystalline calcium aluminates may react too rapidly and may cause flash set of cement. In at least one embodiment, this may be moderated by grinding materials having crystalline calcium aluminates, such as ladle slag, or high Ca fly ash, with a retarder where the materials having crystalline calcium aluminates may be ground with 50-5000 ppm tartaric acid, such as 100-500 ppm tartaric acid, although other retarders have been contemplated. By grinding a material with a retarder, workability and strength development of the resulting cementitious material may be increased and may also be used to promote compatibility of Belite-Ye'elimite-Ferrite (BYF) cement formation with methods for forming SSCs described herein.

The reactivity of a raw material for use in SSCs may be affected by its mineralogy, which, in at least one embodiment, may be dependent on a free energy of the raw material. For example, when the raw material is crystalline, its free energy may be low, which may correspond to low reactivity. Increasing an amorphous content, e.g., an amount of the material having an amorphous structure rather than a crystalline structure, may therefore be desirable. In at least some embodiments, a similar effect on reactivity may be achieved by using crystalline materials with elevated reactivity (e.g., free energy), such as free lime (as used herein, 'free lime' refers to a fraction of calcium oxide that is not combined into the other phases during clinker manufacture), calcium sulfate, and calcium aluminates (e.g., ladle slag, high Ca fly ash).

The fineness of a raw material for SSCs may affect both the reactivity and a rheology of the material when used in concrete. For GGBF slag, the slag must dissolve first before reactions may occur, and may therefore be slow to react. While reactivity of the GGBF slag may be accelerated by adding alkali activators, this may not be a suitable approach for concrete applications due to performance issues such as excess shrinkage and lower dimensional stability of concrete. As an alternative to using alkali activators, the GGBF slag may instead be ground to a fineness of less than 10 microns when used in SSCs. By reducing the particle size of the GGFB slag to less than 10 microns, and, in some embodiments, adding accelerators or activators such as ladle slag and calcium nitrate, the reactivity of the GGBF slag may be increased.

In at least one embodiment, the use of calcium nitrate may increase reactivity to a desired degree when added at above 0.5% s/s. As used herein, the term 's/s' refers to solids/solids percentage, and represents the ratio of one solid component to the total solid content, expressed as a percentage. In at least one embodiment, the calcium nitrate may be added as an accelerator in a range of 0.5%-3% by weight of a supersulfated cementitious material. Other activators, including, but not limited to, cement kiln dust, ladle slags, alkanolamines, may also be effective co-additives but may be added in addition to calcium nitrate for optimum efficiency. In at least one embodiment, ion chelating organic materials, such as alkanolamines, hydroxycarboxylic acids, gluconates and sugar and any derivatives thereof, may further enhance the efficiency of activators used in SSC.

As used herein, the term 'derivative' refers to a compound structurally similar to a parent compound and which may be obtained from the parent compound by one or more chemical reactions, or is a compound having the same basic chemical structure but with one or more chemical groups or moieties substituted, added, or removed. This includes, but is not limited to, compounds where one or more hydrogen atoms are replaced with other atoms or chemical groups; compounds with modified functional groups; salts; esters; amides; complexes; conjugates; hydrates; stereoisomers; tautomers; and structural analogs maintaining the core structural framework of the parent compound.

In at least one embodiment, GGBF slag for SSCs may at least be partially replaced with modified and granulated (or otherwise rapidly cooled in order to prevent crystallization upon cooling) slag from other steelmaking furnaces such as electric arc furnace (EAF) and/or basic oxygen furnace (BOF). Other low carbon reactive materials rich in reactive alumina may also be used, such as clays, red mud, and reactive calcium (e.g., Ca-rich fly ash). Ground limestone may also be used in SSC products as a partially reactive extender to enhance the efficiency of SSCs for various applications.

In at least one embodiment, sulfate activation of supersulfated cementitious materials may be applied to a wider range of materials than those used as per EN15743. For example, according to EN15743, >75% GGBF flag, 5-20% calcium sulfate, and <5% Portland cement or other CaOH-generating activators (% based on weight) may be used to drive dissolution of a supersulfated cementitious material. In contrast, as described herein, sulfate activated binders may demand reduced quantities of lime relative to conventional cement materials. As an example, Portland cement and LC3 cement require 64% and 32% respectively of burned lime (CaO, also referred to as quicklime) while the sulfate activated binders may only demand the equivalent of 12% of burned lime, thus decreasing a comparative carbon footprint of the resulting cementitious material. In at least one embodiment, sulfate activation may be especially suitable for cement technologies that can utilize highly abundant supplementary cementitious materials (SCMs) such as low grade clays, limestone and sulfates.

In at least one embodiment, the supersulfated cementitious materials described herein may be produced in a localized manner using small scale fossil fuel-free kiln technology, instead of large scale Portland cement clinker and calcined clay production. The supersulfated cementation materials may include as low as 12% reactive calcium (e.g., calcium oxide, CaO) for clay activation, in addition to low grade calcium sulfate (such as gypsum or anhydrite) and limestone. In instances where renewable energy methods are used to power calcination, then a carbon footprint of production of the supersulfated cementitious material may be less than 100 kg $CO_2$/ton binder to produce a blend of activated aluminosilicate, sulfate and quicklime. This is less than, for example, the carbon footprint of existing low carbon cements based on partial replacement of conventional cement clinker which may be, for example, 425 kg $CO_2$/ton for LC3 cement having 50% Portland cement clinker. The carbon footprint of supersulfated cementitious material production may be further decreased by scaling an amount of clay used therein.

Turning now to FIG. 1, a simplified process 100 for manufacturing a low carbon footprint supersulfated cementitious material with high early strength development is depicted as a flow diagram. In at least one embodiment, the supersulfated cementitious material may be used as a cement binder. Blocks illustrated in solid lines represent equipment and apparatuses used to carry out steps of the simplified process 100 and blocks illustrated in dashed lines represent materials used in the simplified process 100.

At a first step of the simplified process 100, raw materials 104 may be delivered to a crushing plant 102 and crushed together to form a raw mixture, which may be a solid mixture or a slurry. In at least one embodiment, the raw materials 104 may include a hydraulically reactive material 106, one or more sulfates 108, a first set of one or more additional activators 110, and one or more supplementary cementitious materials (SCMs) 112. It will be appreciated that the raw materials 104 may include additional constituents not shown in FIG. 1 for brevity. Further, the equipment and apparatuses shown in FIG. 1 are non-limiting examples of those used in a process for forming the supersulfated cementitious material and the equipment and materials used may vary in other examples without departing from the scope of the present disclosure.

The hydraulically reactive material 106 may be rich in reactive calcium and aluminate and/or free lime, such as a ladle slag, or an amorphous alumina slag, where the reactive calcium and alumina are present in the glass phase. The hydraulically reactive material 106 may be added as an activator to promote accelerated hardening of a product of the simplified process 100, upon exposure to water, for example, and may at least partially replace use of Portland cement clinker. In at least one embodiment, the hydraulically reactive material 106 may be a recycled material formed as a byproduct of iron and/or steel making. Further, the hydraulically reactive material 106 may include calcium and aluminum in a hydraulically active form such as free lime, mono calcium aluminate, dicalcium aluminate, tricalcium aluminate, calcium sulfoaluminate etc. In at least some instances, the hydraulically reactive material 106 may replace Portland cement clinker entirely and the resulting supersulfated cementitious material may not include any Portland cement clinker in its composition.

The one or more sulfates 108 may also be recycled materials obtained from industrial desulfurization processes including, but not limited to, flue gas desulfurization, biogas desulfurization, and coal gas purification, among others. Further, the one or more sulfates 108 may also be used as activators in the resulting supersulfated cementitious material and may at least partially replace use of virgin source of calcium sulfate, such as natural gypsum, as a source of sulfate. In at least some embodiments, the one or more sulfates 108 derived from industrial desulfurization processes may replace use of virgin source of calcium sulfate, such as natural anhydrite and/or gypsum entirely and the supersulfated cementitious material may not include any natural calcium sulfate.

In at least one embodiment, the one or more sulfates 108 may include calcium sulfate. By adding calcium sulfate, a source of reactive calcium and sulfate may be provided, both of which may participate in hydration of reactive silicates and aluminates. For example, addition of reactive calcium may drive a pH of the supersulfated cementitious material in solution to promote activation of a cementing reaction to form a cement using the supersulfated cementitious material and may increase an amount of reactive calcium present to drive formation of cementing hydrates, such as calcium sulfoaluminates and calcium silicate hydrates. The cementing hydrates may form over a wide range of compositions that may accordingly demand variable amounts of reactive calcium. In at least one embodiment, the amount of reactive calcium, which may be in the form of calcium hydroxide upon reaction with water, in one example, may be low, such as below 15%. For example, the amount of reactive calcium may be as low as 12% if used in combination with calcium sulfate (e.g., 20% as gypsum). The reactive calcium may be produced using a variety of calcination methods including technologies for harvesting solar energy, and low temperature calcination. In addition, a range of grades of calcium sulfate may be used, including one or more of low grade, slow dissolving, and low grade rapid dissolving (e.g., from desulfurization).

The first set of one or more additional activators 110, e.g., in addition to the hydraulically reactive material 106 and the one or more sulfates 108, may include one or more of an alkali salt and an alkaline earth salt, which be used to at least partially replace one or more conventional activators, such as Portland cement clinker and natural gypsum. For example, the alkali and alkaline earth salts may include one or more of sodium salts, potassium salt, and magnesium salts. In conventional cement binders, use of the alkali and alkaline earth salts as activators may be undesirable because these salts may promote an alkali-silica reaction, which may cause swelling in concrete due to a reaction between highly alkaline cement binders and amorphous silica found in concrete aggregates. In the supersulfated cementitious material described herein, however, the material may be more resistant to the alkali-silica reaction, and alkali and alkaline earth salts may be used to promote accelerated hardening without causing concrete degradation.

The first set of the one or more additional activators 110, may also include cement kiln dust (CKD). CKD is a highly alkaline solid waste that accumulates in cement kiln exhaust gas and may include unreacted raw materials. As such, reuse of CKD for cement production may be desirable due to its reactivity and sustainability. The CKD may be used to at least partially replace conventional activators such as Portland cement clinker in the supersulfated cementitious material composition.

The raw materials 104 may further include the one or more SCMs 112, which may impart a concrete mixture (that incorporates the supersulfated cementitious material with the one or more SCMs 112) with desired levels of durability, compressive strength, and resistance to thermal cracking as well as chemical reactions. For example, the one or more SCMS 112 may include GGBF slag having a composition rich in calcium, silica, and aluminum oxides. The GGBF slag may be less abundant than other SCMs, such as aluminosilicate rich clays, volcano ashes, ground limestone (especially low grade limestone rich in aluminosilicates) and coal combustion fly ash. While aluminosilicate rich clays, volcano ashes, ground limestone and coal combustion fly ash may demonstrate low reactivity when used as SCMs in cement binders, use of the first set of the one or more additional activators 110, as well as additional activators described further below, and/or thermal or mechanical activation, may mitigate the reactivity barrier associated with most SCM's when used in SSC binders, such as aluminosilicate rich clays, volcano ashes, limestone and coal combustion fly ash. The one or more SCMs 112 may therefore include a range of SCM's including but not limited to limestone and/or coal combustion fly ash. When the one or more SCMs 112 includes limestone, the limestone may be added at the crushing plant 102 if heating of the raw materials 104 is to be conducted at a temperature below a calcination temperature of the limestone. If the raw materials 104 are to be heated to a temperature at or above a decomposition temperature of the limestone, however, the limestone may instead be added after heating of the raw materials 104, as described further below.

In at least one embodiment, the one or more SCMs 112 may include any one of the GGBF slag, limestone, or coal combustion fly ash. When the GGBF slag is included, the GGBF slag may be ground to a minimum Blaine fineness 4500, which may be performed using specialty grinding and classifying equipment for maximum efficiency. The GGBF slag may further be ground with alkanolamines, such as tri-isopropanol amine (TIPA), using a high performance grinding aid to chemically enhance a reactivity of the GGBF slag. In at least one other embodiment, the one or more SCMs 112 may include any mixture of the one or more SCMs 112. In another embodiment, one of the limestone or the coal combustion fly ash may be used to at least partially substitute an amount of the GGBF slag used in the supersulfated cementitious material. In yet another embodiment, both the limestone and the coal combustion fly ash may be used to a least partially substitute the amount of the GGBF slag used in the supersulfated cementitious material. By coupling the first set of the one or more additional activators 110 with SM Cs such as limestone and/or coal combustion fly ash, increasingly scarce GGBF slag may be substituted with more abundant SCMs without sacrificing desired properties of the supersulfated cementitious material.

Moreover, incorporation of the limestone and the coal combustion fly ash into concrete may provide a technique for sequestering carbon into construction materials.

In at least one embodiment, when the one or more SCMs 112 includes limestone, the limestone may be uncalcined limestone, which may react with reactive alumina to form cementitious components such as calcium aluminate carbonate hydrates, e.g., as formed in Portland limestone cements and LC3 cements. Supersulfated cementitious materials, as described herein, may have relatively high reactive alumina content and therefore addition of uncalcined limestone, calcined limestone or other activator rich in quicklime, such as cement kiln dust, pulp and paper ash may drive desirable formation of similar hydrates. By scaling use of the other limestone or other activator rich in quicklime, the composition of the supersulfated cementitious materials may be diversified to include a wide range of clay chemistries, in addition to alumina-rich steel slags, other than granulated blast furnace slag. In addition, lower grades and/or lower purities of limestone may be used rather than high grade limestone that is demanded for Portland cement production.

In at least one embodiment, the one or more SCMs 112 may include low grade clays. For instance, clays containing kaolin or other aluminosilicates may be activated via low temperature calcination, optionally in combination with mechanical activation such as grinding. Furthermore, clays rich in iron may also have desirable properties for incorporation into supersulfated cementitious materials. The use of the low grade clays may reduce an amount of steel slag (e.g., GGBF slag) used in supersulfated cementitious materials. Activation of the clays may be achieved by a variety of methods, including milling and flash calcination. In at least one embodiment, the clay may be ground prior to calcination with calcium sulfate and limestone, using solar-powered grinding technology.

In at least one embodiment, for non-Portland cement and non-GGBF slag raw materials that are rich in hydraulically reactive compounds, such as the ladle slag and the coal combustion fly ash, the raw materials may be separately ground with chemical retarders. The chemical retarders may include, for example, a sugar acid such as tartaric acid, citric acid, or sodium gluconate. By adding the retarder, adverse effects of the raw materials on dispersants used to control a rheology and workability of a concrete (to which the resulting supersulfated cementitious material may be added) may be mitigated. A dosage of the retarder may depend on the reactivity of the raw material and a retarding power of the retarder.

By crushing the raw materials 104 at the crushing plant 102, the raw materials 104 may be combined to form a homogeneous raw mixture. In some instances, as indicated in FIG. 1 by a first dashed arrow 103, at least a portion of the SCMs 112 may be heat-treated at a kiln 114, as a second step of the simplified process 100. The kiln 114 is shown as a dashed rectangle to indicate it is optional and may be applied to only a portion of the raw materials 104, to all of the raw materials 104, or to none of the raw materials 104. For example, the raw mixture may be crushed at the crushing plant 102, then heated at the kiln 114. In another example, at least a portion of the SCMs may first be treated at the kiln 114, as indicated by a first dashed arrow 103, and then added to the raw mixture, as indicated by a second dashed arrow 105, for crushing at the crushing plant 102. In yet other examples, the raw mixture may be formed and crushed at the crushing plant and then milled at a mill 116 without treatment at the kiln 114.

In at least one embodiment, heat treatment may remove impurities. In at least one embodiment, only a portion of the SCMS 112, such as clays, alumina-rich materials, and/or limestone may undergo calcination at the kiln 114. For example, the limestone may be calcinated to generate CaO, although, in other examples, the limestone may be added directly as a fine powdered cement extender without calcination.

In at least one embodiment, at least a portion of the raw mixture may be heated to promote calcination of the raw materials. As another example, the raw mixture may be heated and/or mechanically activated through grinding to cause target reactive aluminosilicates to form. In yet another example, the raw mixture may include precursors to pozzolanic materials. An initial composition of the raw materials 104 forming the raw mixture may be selected and treated to obtain desired resulting properties, such as a minimum or target degree of hydraulic activity. For example, the raw mixture, after treatment and processing, may be reacted with water to produce an activator, such as water soluble calcium or a pozzolanic material. The activator may then be reacted with calcium, aluminum, or sulfate to form a cementitious hydrate. Certain ingredients of the raw mixture may become more reactive if heat treated, such as specific clays, to form calcined (heat treated) clays.

In at least one embodiment, solar-powered calciners may be used as an alternative to conventional low performance kilns. For example, when clays are incorporated into the supersulfated cementitious material, more precise temperature control may be demanded compared to calcination of limestone, which may be provided by the solar-powered calciners.

After heating is complete, the heat-treated material may be cooled either in the kiln 114 or transferred from the kiln 114 to another receptable for cooling, such as air or water-based cooling. In at least one embodiment, the cooling may be conducted at a rate that minimizes crystallization and thereby causes the heat-treated material to have a glassy, e.g., amorphous structure. For example, increasing a glassiness of the heat-treated material may increase a reactivity of the supersulfated cementitious material when mixed with water and other components to form concrete. As an example, rapid cooling of the heat-treated material may result in the cooled material achieving a target minimum glassiness, such as at least 90%.

The cooled, heat-treated material may be added to a mill 116 at a third step of the simplified process to form a homogeneous ground material with reduced particle or grain size, relative to a grain size of the cooled, heat-treated material. In some instances, as described above, carbonate-based SCMs, such as limestone, may also be added to the mill 116 after heating, thereby mitigating heating of the carbonate-based SCMs to its decomposition temperature, which may otherwise release $CO_2$. In at least one embodiment, the carbonate-based SCMs added at the milling stage do not release $CO_2$ and its addition, e.g., at the milling stage, may enhance cement performance due to reaction of the carbonate-based SCMs with calcium silicate aluminate hydrates in a hydrating SSC. The calcium silicate aluminate hydrates may be present in the heat-treated mixture, upon addition of water to yield a hydrated mixture, and reaction between the carbonate-based SCMs and the calcium silicate aluminate hydrates may produce carbonate aluminate compounds, which are desirable in certain cements.

Decreasing the grain size may increase a surface area-to-volume ratio of the supersulfated cementitious material, thereby increasing its reactivity. After the heat-treated material is ground to form a ground material, the ground material may be transferred to a separator 120 at a fourth step of the simplified process 100. A second set of one or more additional activators 118 may be added to the ground material in the separator 120.

The second set of the one or more additional activators 118 may include accelerators such as one or more of calcium nitrate and calcium nitrite, both of which may further promote early strength development of the supersulfated cementitious material, in addition to the first set of the one or more additional activators 110 included in the raw materials 104. The second set of the one or more additional activators 118 may be added after grinding the cooled material to circumvent degradation of the second set of the one or more additional activators 118 that may result if subjected to grinding. Other additives, such as dispersants, that have poor tolerance to mechanical treatment may also be added to the ground material with the second set of the one or more additional activators 118.

At the separator 120, a mixture of the ground material, the second set of the one or more additional activators 118, and any other additives, may be separated, e.g., according to grain size, to obtain one or more products 122 with a selected grain size distribution. The one or more products 122 may be the supersulfated cementitious material, or different grain size fractions of the supersulfated cementitious material, which may be used in concrete formulations as a hydraulic binder. In at least one embodiment, the one or more products 122 may be used as standalone concrete binders with strength development similar to that of conventional cement binders. In at least one other embodiment, the one or more products 122 may be blended with at least one other binder having rapid hardening properties, such as materials including calcium sulfoaluminates to further accelerate hardening.

As described above, the supersulfated cementitious material may be produced using recycled materials, such as ladle slag and desulfurization sulfates, that may be used to replace activators manufactured or obtained via high carbon-footprint processes. As a result the supersulfated cementitious material may be provided as a low carbon footprint SSC binder having an increased content of recycled constituents, compared to conventional SSC binders relying on GGBF slag and with Portland cement clinker and natural gypsum as activators. The supersulfated cementitious material may demonstrate early strength development (e.g., duration of time for hardening) that is faster than conventional SSC binders, as shown below in Tables 1, 3-7. In at least one embodiment, the supersulfated cementitious material may conform with European Standard SSC specification EN 15743:2010+Al: 2015. In at least some embodiments, the early strength development of the supersulfated cementitious material may be substantially equal to the early strength development of other, non-SSC binders (e.g., cement binders known to harden faster than SSC binders). It will be noted that when the term "substantially" is used herein, it is meant that the recited relationship, characteristic, parameter, or value need not be realized with exact precision, but that deviations or variations known to those of skill in the art may occur to an extent that does not preclude the effect the relationship, characteristic, parameter, or value was intended to provide. In addition, by substituting GGBF slag with carbonaceous materials, such as limestone and coal combustion fly ash, carbon may be stored in a solid medium and used in construction applications, thereby providing sequestering the carbon into construction materials. Substitution with limestone and/or coal combustion fly ash may also enhance early strength development and/or reduce a brittleness of the supersulfated cementitious material.

TABLE 1

| Supersulfated cement formulations (in wt %). | | | | | | |
|---|---|---|---|---|---|---|
| Mixture | 1 | 2 | 3 | 4 | 5 | 6 |
| GGBF slag | — | 81.50% | 79% | 76.50% | 75% | 67.0% |
| Ladle slag | — | — | | 5% | 5% | 13.4% |
| Natural gypsum | — | 15.50% | 15.50% | 15% | 15% | 13.8% |
| Desulfurization sulfates | — | — | | 0.50% | 0.50% | 1.5% |
| CEM I Portland cement | 100% | 3% | 3% | 3% | 2% | 1.8% |
| Calcium nitrate | — | — | 2.50% | — | 2.50% | 2.50% |
| 1 day compr strength, Mpa | 16.8 | 4.7 | 10.8 | 9.5 | 15.8 | 22.4 |
| 2 day compr strength, Mpa | 24.5 | 9.2 | 19.3 | 21.2 | 26.1 | 29.3 |
| 7 day compr strength, Mpa | 39.2 | 24.3 | 35.5 | 37.2 | 40.9 | 44.8 |
| 28 day compr strength, Mpa | 51.2 | 42.2 | 46.1 | 48.4 | 53.4 | 57.8 |

Table 1 shows different cement sample formulations and corresponding compressive strength measurements taken at 1 day, 2 days, 7 days, and 28 days after formation of the cement mixtures. Each formulation includes the constituents listed in Table 1 mixed with cement mortar formed according to standard EN196 sand at w/c 0.40 (according to a modified standard EN196, wherein sand is used at a w/c 0.4 instead of w/c 0.5). Sample 1 does not include any recycled materials and has a content of 100% Portland cement. Samples 2 and 3 are conventional supersulfated cement formulations without and with calcium nitrate added, respectively. Samples 4 to 6 have decreasing GGBF slag content and varying ladle slag, natural gypsum, desulfurization sulfate, calcium nitrate, and Portland cement clinker contents.

The results shown in Table 1 indicate that increasing the ladle slag and desulfurization sulfate contents while decreasing the GGBF slag content results in higher compressive strength after one day. After one day, sample 6 (having the highest ladle slag and desulfurization sulfate content) demonstrates the highest compressive strength. For example, sample 6 has a compressive strength of 22.4 MPa after one day compared to 16.9 Mpa for sample 1. After 28 days, the compressive strength of sample remains higher than the other samples. As such, high ladle slag and desulfurization sulfate contents (relative to the other samples), with calcium nitrate added, yields a cement binder that hardens faster and remains stronger than a conventional cement binder (sample 1) or a SSC binder composed of GGBF slag, natural gypsum, Portland cement, and calcium nitrate (sample 3).

In at least one embodiment, a supersulfated cementitious material with rapid early strength development may have a composition including at least 5 wt % of ladle slag. In another embodiment, the supersulfated cementitious material may include at least 0.5 wt % of desulfurization sulfates. In another embodiment, the supersulfated cementitious material may have less than 82 wt % of GGBF slag. In another embodiment, the supersulfated cementitious material may have 3 wt % or less of Portland cement clinker. In yet another embodiment, the supersulfated cementitious material may at least 13 wt % of ladle slag and at least 1% of desulfurization sulfates. In at least one embodiment, a supersulfated cementitious material with rapid early strength development may have a composition including between 5 wt % and 20% of ladle slag.

Furthermore, in at least some examples, the supersulfated cementitious material may include additional SCMs, such as limestone and/or coal combustion fly ash. In at least one embodiment, the limestone and/or coal combustion fly ash may at least partially replace GGBF slag in the supersulfated cementitious material. In at least one embodiment, the supersulfated cementitious material may include 5 wt % to 30 wt % of limestone and/or coal combustion fly ash.

By forming a supersulfated cementitious material with ladle slag generated as a byproduct of iron or steel making, sulfates from industrial desulfurization processes, and other additives, a construction materials, such as concrete, incorporating the supersulfated cementitious material may have an increased content and variety of recycled materials and a lower carbon footprint. The supersulfated cementitious material may meet target specifications, such as EN 15743: 2010+Al: 2015, and demonstrate faster and increased strength development than conventional supersulfated cement binders. Furthermore, increasing an amount of ladle slag and/or desulfurization sulfates in the supersulfated cementitious material may decrease reliance on GGBF slag while providing a higher performing product.

In at least one embodiment, a supersulfated cementitious material may be incorporated in an ultralow carbon cement formulated based on BYF cement calcium sulfoaluminate phases. At least a portion of a composition of the cement may be formed from secondary materials obtained from a variety of other industries. By using techniques for forming the supersulfated cementitious material as a BYF cement, a fast-setting composite binder may be produced that is suitable for rapid construction applications, such as in urban areas relying on modem concrete production methods. An example of a clinker formulation in which the supersulfated cementitious material may be incorporated is shown below in Table 2.

TABLE 2

| Concrete Mixture Formulation with Supersulfated Cementitious Materials. | |
|---|---|
| Materials (used dry) | Concrete mixture design |
| Sand | 11.71 kg |
| 2-4 mm aggregate | 2.60 kg |
| 4-8 mm aggregate | 2.60 kg |
| 8-12 mm aggregate | 2.60 kg |
| Dry cementitious material | 5.27 kg |
| Retarder | Citric acid as needed to make dispersant respond |
| Dispersant | Sika ® EVO 26 as needed to make flowable concrete |
| Water | 40% of dry cementitious material |

The concrete mixture may include sand and aggregates in addition to a dry cementitious material, which may be a supersulfated cementitious material based on calcined clay, in at least one embodiment. The supersulfated cementitious material may include a BYF cement in the formulation shown in Table 2, where the BYF cements may have a primary calcium sulfoaluminate phase of ye'elemite, and various calcium silicates as a combined secondary phase. Citric acid or other retarders such as but not limited to tartaric acid, borates, sugar derivatives may be added as a retarder to maintain an effectiveness of a dispersant and may be added in an amount that corresponds to an amount of the dispersant in the clinker. As shown in Table 2, the dispersant may be a lignosulfonate type, naphthalene or melamine based type, or polycarboxylate type, plasticizer (such as polycarboxylate-based Sika® EVO 26) which may be added to the supersulfated cement mixture in an amount that allows a resulting concrete formulation to flow and be poured. An amount of water that may be added to the clinker may be 40% of a mass of the dry cementitious material.

of samples 4, 5, or 6 in Table 1; samples 19 to 24 in Table 3; samples 4, 5, or 6 in Table 4; samples 10, 11, or 12 in Table 5; samples 13 to 18 in Table 6; samples 28, 29, or 30 in Table 7; or may have varying quantities of the listed constituents. Other additives not shown in Tables 1, 3-7 may also be included in the formulation, including one or more of calcium nitrite, alkali salts, alkaline earth salts, cement kiln dust, limestone, coal combustion fly ash, clays containing aluminosilicates, alumina rich waste products from the metals industry, and dispersants. The method may be carried out in a manufacturing facility with various suitable equipment and machinery for performing the steps described below, which may include automated processes, manual processes, or a combination thereof.

TABLE 3

| Supersulfated cement formulations with novel materials (in wt %). | | | | | | |
|---|---|---|---|---|---|---|
| Mixture | 19 | 20 | 21 | 22 | 23 | 24 |
| Calcined clay "C"BET N2 surface area 1700 m2/kg | 65.0% | 65.0% | 62.0% | 62.0% | 62.0% | 62.0% |
| Calcium sulfate natural anhydrite, BSA 6000 m2/kg | 15.0% | 15.0% | 17.0% | 17.0% | 17.0% | 17.0% |
| Desulfurization sulfate | 1.0% | 1.0% | 1.0% | 1.0% | 1.0% | 1.0% |
| CEM I Portland cement, BSA 4200 | 4.0% | 4.0% | 5.0% | 5.0% | — | — |
| Ladle slag, BSA 5000 m2/kg | 15.0% | 15.0% | — | — | 15.0% | 15.0% |
| BYF clinker, BSA 4800 m2/kg | — | — | 15.0% | 15.0% | 5.0% | 5.0% |
| Chemical additives | | | | | | |
| Sodium gluconate | 0.20% | 0.20% | — | — | — | — |
| Tartaric acid | | | 0.35% | 0.35% | 0.30% | 0.30% |
| Calcium nitrate anhydrous | — | 2.0% | — | 2.0% | — | 2.0% |
| Compressive strength development | | | | | | |
| 1 day compr strength, Mpa | 12.2 | 14.7 | 2.6 | 4.8 | 8.5 | 10.3 |
| 2 day compr strength, Mpa | 23.8 | 27.4 | 17.6 | 18.8 | 16.2 | 19.5 |
| 7 day compr strength, Mpa | 41.1 | 44.7 | 33.3 | 37.1 | 31.3 | 35.2 |
| 28 day compr strength, Mpa | 48.3 | 53.1 | 50.6 | 56.4 | 42.6 | 46.1 |

Table 3 shows further results when using other novel materials than GBS being capable of providing reactive alumina and calcium in the hydrating supersulfated cement formulation, including calcined clays and Belite Ye'elimite Ferrite clinker (BYF) made from recycled residuals from other industry.

In at least one other embodiment, the supersulfated cementitious material further comprises a calcium sulfoaluminate clinker. As used herein, the term 'calcium sulfoaluminate clinker' refers to a hydraulic material comprising calcium sulfoaluminate (Ye'elimite, $C_4A_3\check{S}$) as a reactive phase, along with other phases such as belite ($C_2S$), ferrite ($C_4AF$), calcium magnesium silicates and other minor constituents.

As used herein, 'BYF clinker' refers to a specific type of CSA clinker where calcium sulfoaluminate ($C_4A_3\check{S}$) comprises <60% wt of the clinker. In at least one other embodiment, the BYF clinker is manufactured from at least 60% recycled materials such as metal and combustion slags from other industry.

In at least one other embodiment, the supersulfated cementitious material comprises a reactive material, and between 0.5 wt % and 5 wt % of the belite-ye'elimite-ferrite (BYF) clinker, such as between 0.5 wt % and 3 wt %.

Figure 2:
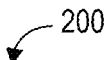
FIG. 2 shows a flowchart of a method of manufacturing a cementitious material, according to an embodiment of the present disclosure.
Figure 2:
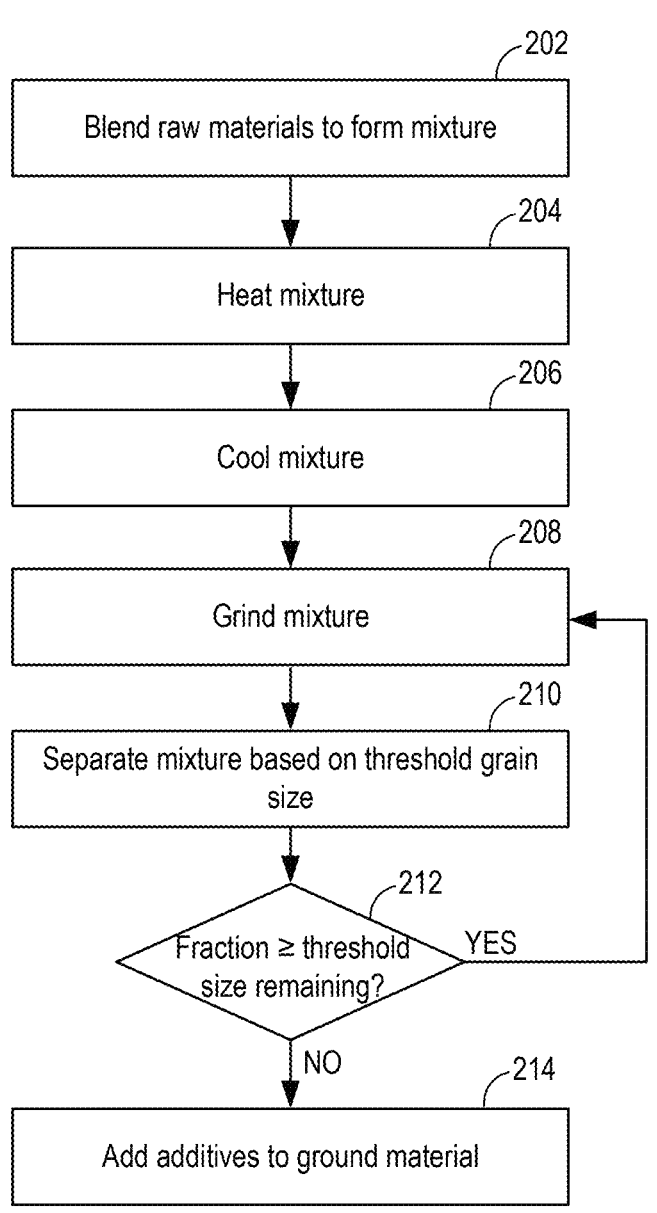

An example of a method 200 of manufacturing a supersulfated cementitious material for construction applications is depicted in a flowchart in FIG. 2. The supersulfated cementitious material may have a formulation similar to any At 202, the method includes blending raw materials to form a mixture. The raw materials may include any of the raw materials 104 shown and described with reference to FIG. 1, including, but not limited to reactive material, desulfurization sulfates, SCMs, and other, additional activators. The SCMs may include one or more of GGBF slag, limestone, clay, alumina rich waste products from the other industry (depending on a subsequent temperature of heating, as described above), and coal combustion fly ash, clays not requiring heat treatment, along with retarders, and the additional activators may include one or more of cement kiln dust, alkali salts and alkaline earth salts. At the crushing plant, the raw materials may be added to a machine that applies a force to break the raw materials down into smaller pieces. The raw materials may also be blended together, e.g., by mixing, either during or after crushing the raw materials.

At 204, the method includes heating the mixture to thermally decompose impurities and/or volatile substances. The term 'heating', as used herein, encompasses providing thermal activation (calcination). In some instances, the mixture may also be mechanically treated (e.g., ground to reduce particle size). For example, the mixture may be transferred to a furnace or reactor, such as a kiln, and heated to a temperature high enough to promote calcination or partial decomposition and/or evaporation of impurities but below melting or decomposition temperatures of the raw materials. In some examples, the mixture may be heated to a temperature that drives calcination of at least a portion of the raw materials under a low oxygen or a controlled oxygen environment. In yet other examples, the mixture may be heated to melt at least a portion of the raw materials.

At 206, the method includes cooling the mixture, such as by water-cooling or air-cooling. In some instances, such as when the heating of the mixture causes at least a portion of the raw materials to melt, the cooling may be conducted at a rate that results in the melted materials to solidify with an amorphous structure. As an example, a degree of amorphousness in the cooled material may increase as the rate of cooling increases.

At 208, the method includes grinding the cooled mixture. For example, the cooled mixture may be transferred to a mill, such as a roller mill or a ball mill, and ground to decrease a particle or grain size of the mixture. The mixture may be further ground to increase and/or customize a particle or grain surface area in a secondary mill designed for custom grinding. In one example, grinding of the mixture to a fine powder may be desired. As described previously, decreasing the grain size of the mixture may increase its At 212, the method includes determining if a portion of the ground mixture remains (e.g., a remaining portion) that is composed of grains that are equal to or greater than the threshold grain size. If the remaining portion is present in the separator, the method returns to 208 to return the mixture to the mill and grind the remaining portion again. If the remaining portion is not present in the separator, e.g., all of the mixture is ground to smaller than the threshold size, the method proceeds to 214 to add additional additives to the mixture to form the supersulfated cementitious material. The additional additives may include additional chemicals additives or activators, such as one or more of ion chelating agents, compounds capable of providing calcium ions in aqueous solution such as calcium nitrate and calcium nitrite; and any other materials that may otherwise degrade or decompose while undergoing grinding. The additional additives may further include calcium sulfoaluminate rapid hardening binders. The resulting supersulfated cementitious material may be used as a binder in concrete mixtures, for example.

TABLE 4

| Supersulfated cement formulations without tartaric acid (in wt %). | | | | | | |
|---|---|---|---|---|---|---|
| Mixture | 1 | 2 | 3 | 4 | 5 | 6 |
| Granulated blast furnace slag "A", BSA 5000 m2/kg | — | 82% | 82% | 76.5% | 76.5% | 76.5% |
| Calcium sulfate natural anhydrite, BSA 6000 m2/kg | — | 15.0% | 15.0% | 15.0% | 15.0% | 15.0% |
| Desulfurization sulfate | — | — | — | 0.5% | 0.5% | 0.5% |
| CEM I Portland cement, BSA 4200 | 100% | 3.0% | 3.0% | 3.0% | 3.0% | 3.0% |
| Ladle slag, BSA 5000 m2/kg | — | — | — | 5.0% | 5.0% | 5.0% |
| Amorphous alumina slag, BSA 5000 m2/kg | — | — | — | — | — | — |
| Chemical additives | | | | | | |
| Tartaric acid | — | — | — | — | — | — |
| Calcium nitrate anhydrous | — | — | 1.0% | — | 1.0% | 2.00% |
| Compressive strength development | | | | | | |
| 1 day compr strength, Mpa | 13.6 | 8.2 | 9.7 | 9.4 | 14.2 | 15.4 |
| 2 day compr strength, Mpa | 21.8 | 15.7 | 16.4 | 13.6 | 21.7 | 22.1 |
| 7 day compr strength, Mpa | 37.4 | 33.6 | 34.1 | 23.6 | 34.6 | 35.8 |
| 28 day compr strength, Mpa | 50.7 | 48.2 | 48.8 | 39.8 | 46.7 | 48.6 | reactivity and allow the mixture to be readily mixed with other materials to form concrete, for example.

At 210 of the method, grains smaller than a threshold size may be separated from grains equal to or larger than the threshold size by transferring the mixture to a separator. In some instances, the separator may be integrated into the mill and transfer of the mixture may be obviated. The separator may facilitate mechanical separation of the ground mixture to extract and collect a small grain fraction (e.g., grains smaller than the threshold size) from the ground mixture.

Table 4 shows different cement sample formulations without addition of tartaric acid, and corresponding compressive strength measurements taken at 1 day, 2 days, 7 days, and 28 days after formation of the cement mixtures. Sample 1 does not include any recycled materials and has a content of 100% Portland cement. Samples 2 and 3 are conventional supersulfated cement formulations without the novel activator Ladle slag and with calcium nitrate added, respectively. Samples 4 to 6 have 5% novel activator Ladle slag and without and with calcium nitrate added, respectively.

TABLE 5

| Supersulfated cement formulations with tartaric acid (in wt %). | | | | | | |
|---|---|---|---|---|---|---|
| Mixture | 7 | 8 | 9 | 10 | 11 | 12 |
| Granulated blast furnace slag "A", BSA 5000 m2/kg | — | 82% | 82% | 76.5% | 76.5% | 76.5% |
| Calcium sulfate natural anhydrite, BSA 6000 m2/kg | — | 15.0% | 15.0% | 15.0% | 15.0% | 15.0% |
| Desulfurization sulfate | — | — | — | 0.5% | 0.5% | 0.5% |

TABLE 5-continued

| Supersulfated cement formulations with tartaric acid (in wt %). | | | | | | |
|---|---|---|---|---|---|---|
| Mixture | 7 | 8 | 9 | 10 | 11 | 12 |
| CEM I Portland cement, BSA 4200 | 100% | 3.0% | 3.0% | 3.0% | 3.0% | 3.0% |
| Ladle slag, BSA 5000 m2/kg | — | — | — | 5.0% | 5.0% | 5.0% |
| Amorphous alumina slag, BSA 5000 m2/kg | — | — | — | — | — | — |
| Chemical additives | | | | | | |
| Tartaric acid | 0.10% | 0.10% | 0.10% | 0.10% | 0.10% | 0.10% |
| Calcium nitrate anhydrous | — | — | 1.0% | — | 1.0% | 2.00% |
| Compressive strength development | | | | | | |
| 1 day compr strength, Mpa | 11.4 | 2.1 | 2.3 | 8.4 | 14.2 | 16.0 |
| 2 day compr strength, Mpa | 20.8 | 7.8 | 8.3 | 12.1 | 24.0 | 27.7 |
| 7 day compr strength, Mpa | 38.2 | 32.7 | 33.1 | 24.3 | 36.8 | 40.3 |
| 28 day compr strength, Mpa | 52.7 | 52.3 | 54.6 | 42.1 | 57.2 | 60.6 |

Table 5 shows the corresponding results when a small dosage, 0.1% of tartaric acid was added to the otherwise identical formulations in Table 4. The effect of combining tartaric acid with calcium nitrate was surprisingly strong when using the alternative ladle slag activator in the formulations, samples 10-12.

It is clear from the compressive strength development results that while including the novel activator ladle slag is improving the strength development of the SSC formulation, the novel ladle slag activation is not reacting to its full potential, unless both a chelating agent such as tartaric acid and a calcium based accelerator, such as calcium nitrate, is included in the SSC formulation.

In at least one other embodiment, the supersulfated cementitious material comprises one or more ion chelating agents. Examples of ion chelating agents include but not limited to alkanolamines, hydroxycarboxylic acids, gluconates and derivatives thereof. In at least one other embodiment, the supersulfated cementitious material comprises one or more hydroxycarboxylic acids, such as tartaric acid, citric acid, gluconic acid, lactic acid, malic acid or phosphoric acid.

In at least one other embodiment, the supersulfated cementitious material comprises one or more compounds capable of providing calcium ions in aqueous solution.

Examples of suitable compounds include but not limited to highly soluble calcium salts, such as calcium nitrate, calcium nitrite, calcium chloride, calcium bromide, calcium iodide, calcium acetate, calcium formate, calcium gluconate, calcium lactate or calcium propionate. It should be understood that compounds capable of providing calcium ions in aqueous solution may also include compounds that are capable of indirectly providing calcium ions by increasing pH, and thus, the dissolution rate of SCMs, such as for example sodium and potassium salts.

In at least one other embodiment, the supersulfated cementitious material comprises one or more ion chelating agents, and the supersulfated cementitious material further comprises one or more compounds capable of providing calcium ions in aqueous solution.

It should be understood that certain compounds described herein may serve one or more functions in the composition. By way of non-limiting example, calcium nitrate can function as a retarder, a chelating agent, and/or a source of soluble calcium. The predominant function or functions of such compounds may vary based on factors including, but not limited to, dosage, composition, and conditions of use.

TABLE 6

| Supersulfated cement formulations with novel activators (in wt %). | | | | | | |
|---|---|---|---|---|---|---|
| Mixture | 13 | 14 | 15 | 16 | 17 | 18 |
| Granulated blast furnace slag "A", BSA 5000 m2/kg | 76.5% | 76.5% | 76.5% | 82% | 82% | 82% |
| Calcium sulfate natural anhydrite, BSA 6000 m2/kg | 15.0% | 15.0% | 15.0% | 15.0% | 15.0% | 15.0% |
| Desulfurization sulfates | 0.5% | 0.5% | 0.5% | — | — | — |
| CEM I Portland cement, BSA 4200 | 3.0% | 3.0% | 3.0% | 2.0% | 2.0% | 2.0% |
| Amorphous alumina slag, BSA 5000 m2/kg | 5.0% | 5.0% | 5.0% | — | — | — |
| BYF clinker, BSA 4800 m2/kg | — | — | — | 1.0% | 1.0% | 1.0% |
| Chemical additives | | | | | | |
| Tartaric acid | 0.10% | 0.10% | 0.10% | — | 0.20% | 0.20% |
| Calcium nitrate anhydrous | — | 1.0% | 2.00% | — | — | 1.00% |
| Compressive strength development | | | | | | |
| 1 day compr strength, Mpa | 8.8 | 9.4 | 9.8 | 4.2 | 1.5 | 5.8 |
| 2 day compr strength, Mpa | 15.0 | 17.8 | 20.2 | 18.1 | 10.1 | 16.8 |

TABLE 6-continued

| Supersulfated cement formulations with novel activators (in wt %). | | | | | | |
|---|---|---|---|---|---|---|
| Mixture | 13 | 14 | 15 | 16 | 17 | 18 |
| 7 day compr strength, Mpa | 32.1 | 36.2 | 42.8 | 30.8 | 39.8 | 43.3 |
| 28 day compr strength, Mpa | 44.3 | 50.4 | 57.2 | 39.1 | 47.6 | 52.8 |

Table 6 shows further results when yet other novel activators, amorphous alumina slag from the alumina recycling industry, and belite ye'elimite ferrite clinker made from recycled industrial residuals, respectively, are used instead of ladle slag.

It will be evident to those skilled in the art that any material that is capable of releasing silica, alumina, calcium and sulfate are potentially useful raw materials for making supersulfated cement formulations. Said formulations develop superior strengths compared to traditional Portland cement-based formulations, because significant amounts of both calcium aluminate sulfate hydrates and calcium silicate hydrates form essentially without excess calcium hydroxide. Further it will be evident to those skilled in the art that the strength development rate is governed mainly by the formation of calcium aluminate sulfate hydrates at early ages and calcium silicate hydrates or calcium silicate aluminate hydrates at later ages; The use of chemical additives capable of chelating silica, alumina, calcium, sulfate, iron can cause a strong synergistic effect on the formation of said hydrates if used in combination with an accelerator such that it is possible to engineer a resulting cement formulation that delivers optimal strength development rates for different applications based on both raw materials selection and chemical additives.

In another embodiment, the supersulfated cementitious material may have 3 wt % or less of Portland cement clinker. In yet another embodiment, the supersulfated cementitious material may at least 15 wt % of amorphous alumina slag and between 0.5 wt % and 1 wt % of desulfurization sulfates. In at least one embodiment, a supersulfated cementitious material with rapid early strength development may have a composition including between 5 wt % and 20% of amorphous alumina slag.

In at least one embodiment, a supersulfated cementitious material with rapid early strength development may have a composition including at least 5 wt % of BYF clinker. In another embodiment, the supersulfated cementitious material may include at least 0.5 wt % of desulfurization sulfates. In another embodiment, the supersulfated cementitious material may have less than 82 wt % of GGBF slag. In another embodiment, the supersulfated cementitious material may have 3 wt % or less of Portland cement clinker. In yet another embodiment, the supersulfated cementitious material may at least 15 wt % of BYF clinker and between 0.5 wt % and 1 wt % of desulfurization sulfates. In at least one embodiment, a supersulfated cementitious material with rapid early strength development may have a composition including between 5 wt % and 20% of BYF clinker.

TABLE 7

| Supersulfated cement formulations with tartaric acid (in wt %). | | | | | | |
|---|---|---|---|---|---|---|
| Mixture | 25 | 26 | 27 | 28 | 29 | 30 |
| Granulated blast furnace slag "B", BSA 5000 m2/kg | 82% | 82% | 82% | 76.5% | 76.5% | 76.5% |
| Calcium sulfate natural anhydrite, BSA 6000 m2/kg | 15.0% | 15.0% | 15.0% | 15.0% | 15.0% | 15.0% |
| Desulfurization sulfate | — | — | — | 0.5% | 0.5% | 0.5% |
| CEM I Portland cement, BSA 4200 | 3.0% | 3.0% | 3.0% | 3.0% | 3.0% | 3.0% |
| Ladle slag, BSA 5000 m2/kg | — | — | — | 5.0% | 5.0% | 5.0% |
| Amorphous alumina slag, BSA 5000 m2/kg | — | — | — | — | — | — |
| Chemical additives | | | | | | |
| Tartaric acid | 0.10% | 0.10% | 0.10% | 0.10% | 0.10% | 0.10% |
| Calcium nitrate anhydrous | — | 1.0% | 2.0% | — | 1.0% | 2.0% |
| Compressive strength development | | | | | | |
| 1 day compr strength, Mpa | 4.7 | 6.5 | 7.7 | 7.0 | 10.3 | 12.0 |
| 2 day compr strength, Mpa | 9.7 | 12.3 | 14.4 | 11.9 | 14.7 | 18.2 |
| 7 day compr strength, Mpa | 24.3 | 30.9 | 35.4 | 23.4 | 31.8 | 33.1 |
| 28 day compr strength, Mpa | 45.2 | 50.6 | 56.7 | 41.4 | 52.9 | 59.3 |

In at least one embodiment, a supersulfated cementitious material with rapid early strength development may have a composition including at least 5 wt % of amorphous alumina slag. In another embodiment, the supersulfated cementitious material may include at least 0.5 wt % of desulfurization sulfates. In another embodiment, the supersulfated cementitious material may have less than 82 wt % of GGBF slag.

Table 7 shows results where a rather poorly performing traditional supersulfated cement formulation based on a GBS containing less than 12% $Al_2O_3$ is greatly improved with the following additions to the formula: i) A ladle slag, a carrier of reactive alumina and calcium, ii) Tartaric acid, a chelating agent, iii) Calcium Nitrate, a calcium based cement accelerator The compressive strength development for all mixtures were tested according to EN196 using standard sand and w/c 0.50. A polycarboxylate-based dispersant was added to the mix water at 0.8% by weight of the total powder content excluding the standard sand.

w/c 0.40) and a sixth graph 412 (GGBS "B", 2% calcium nitrate, w/c 0.40). The graphs show the effect of Arvedi ladle slag, which includes both free lime and calcium aluminate activators, on compressive strength. The Arvedi ladle slag may at least partially replace Portland cement in a SSC, and,

TABLE 8

Elemental composition by XRF expressed as oxides (in wt %).

| Material | Main Oxides | | | | | |
| | CaO | SiO2 | Al2O3 | SO3 | MgO | Fe2O3 |
|---|---|---|---|---|---|---|
| Granulated blast furnace slag "A", BSA 5000 m2/kg | 38.3% | 32.6% | 14.2% | 1.2% (S 0.7%) | 8.7% | 0.8% |
| Granulated blast furnace slag "B", BSA 5000 m2/kg | 38.4% | 34.9% | 10.4% | 1.5% (S 0.9%) | 12.3% | 0.5% |
| Calcium sulfate natural anhydrite, BSA 6000 m2/kg | 40.7% | 0.5% | <0.1% | 56.0% | 0.3% | <0.1% |
| Desulfurization sulfate | 50.8% | 2.0% | 1.1% | 42.7% | 1.1% | 0.6% |
| CEM I Portland cement, BSA 4200 | 63.8% | 22.8% | 3.5% | 2.2% | 1.0% | 4.7% |
| Ladle slag, BSA 5000 m2/kg | 53.0% | 2.0% | 30.1% | 2.4% | 8.0% | 3.7% |
| Amorphous alumina slag, BSA 5000 m2/kg | 33.9% | 13.7% | 36.9% | 1.0% | 11.7% | 1.7% |
| BYF clinker, BSA 4800 m2/kg | 39.8% | 14.3% | 26.2% | 6.8% | 9.6% | 2.0% |
| Calcined clay "C"BET N2 surface area 1700 m2/kg | 0.2% | 47.6% | 43.7% | <0.1% | 0.4% | 3.3% |

Figure 4A:
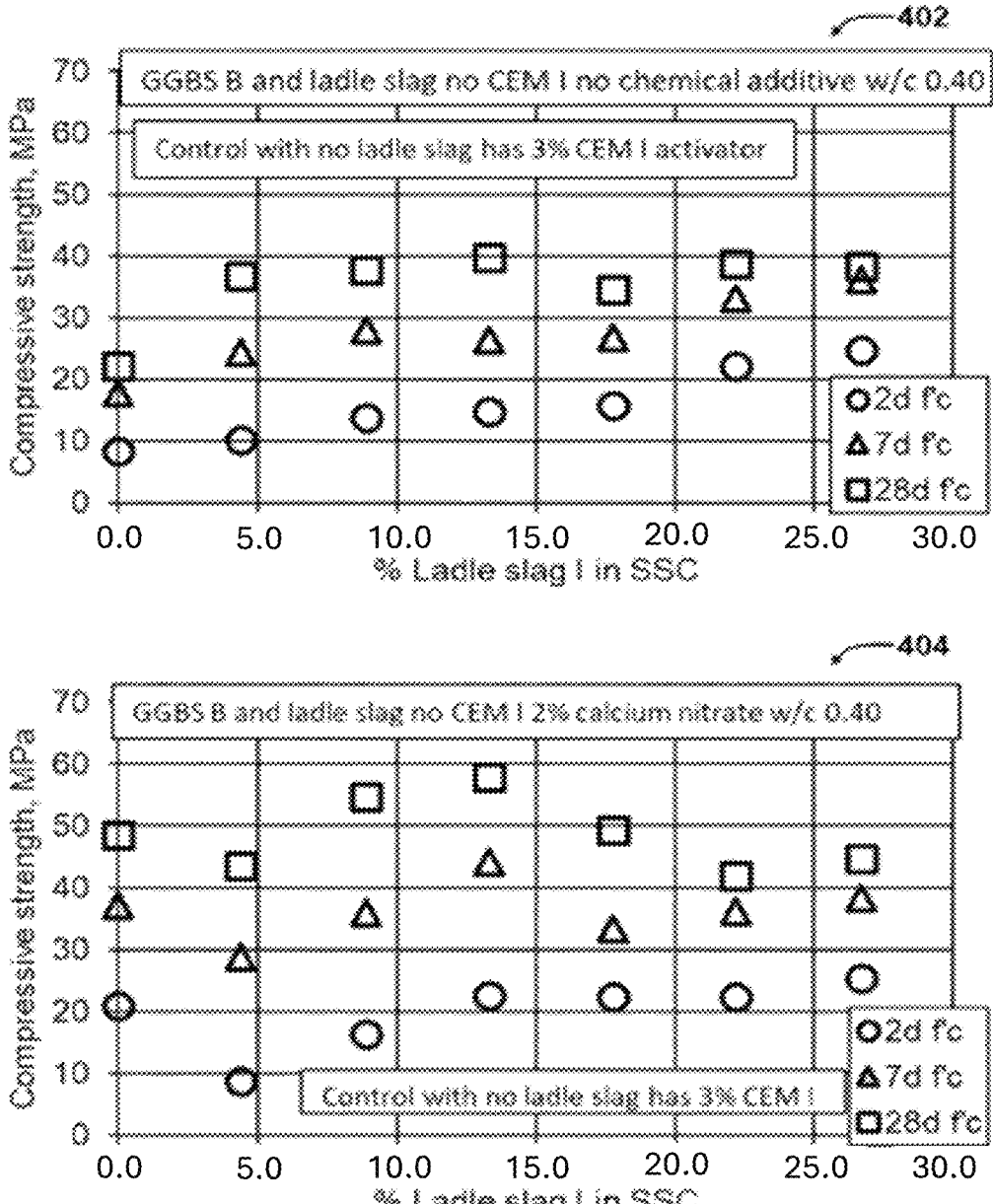
FIGS. 4a to 4c show trial results of optimization of calcium nitrate addition to a ladle slag, relative to compressive strength.
Figure 4B:
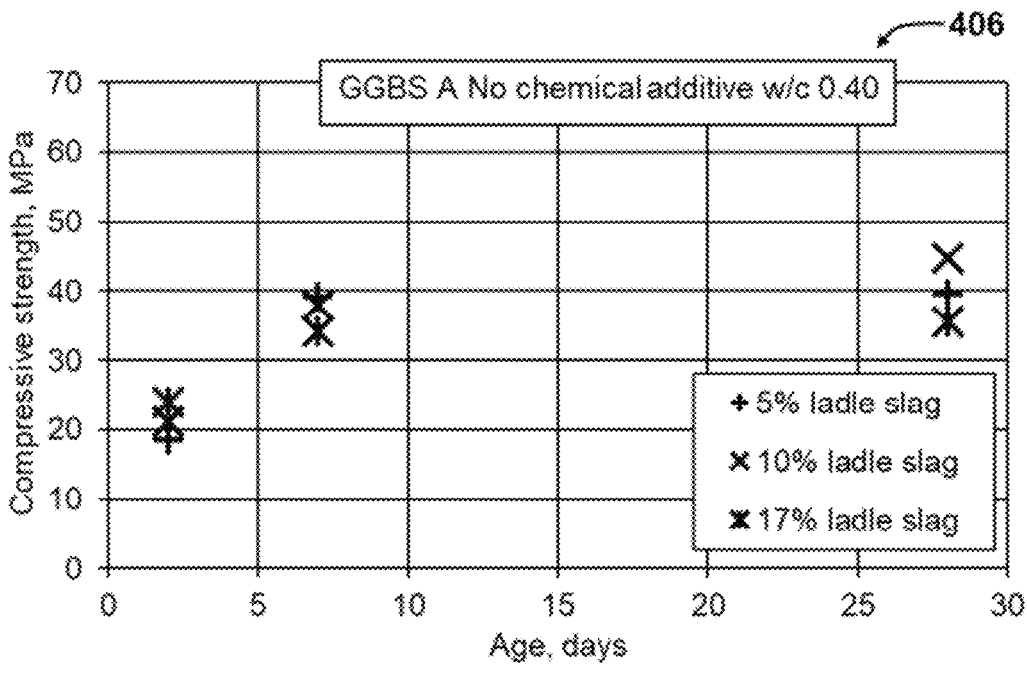
Figure 4B:
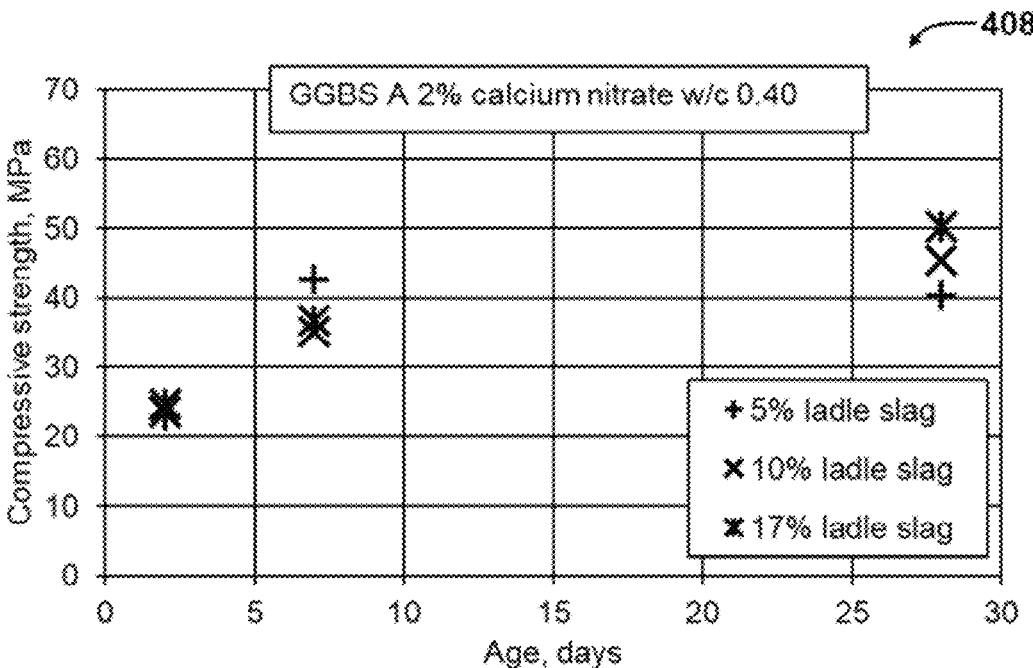
Figure 4C:
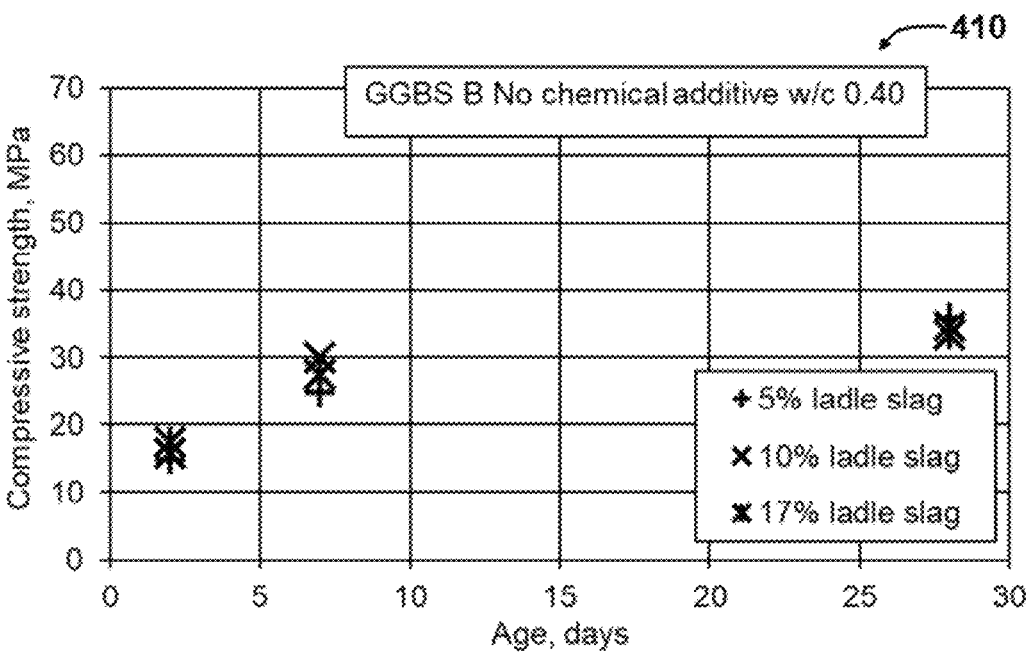
Figure 4C:
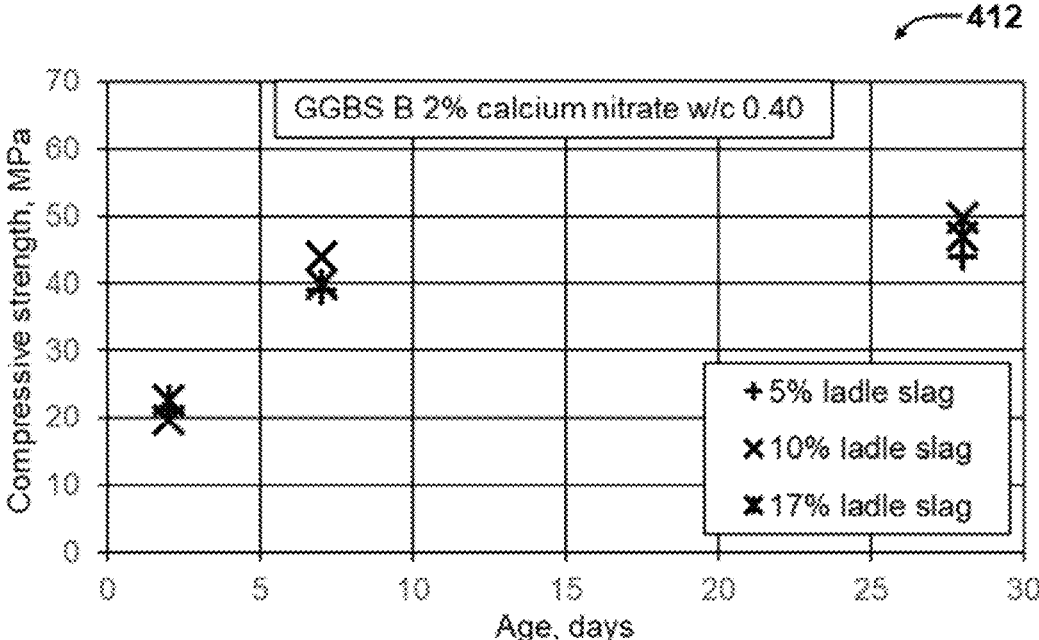
Figure 5:
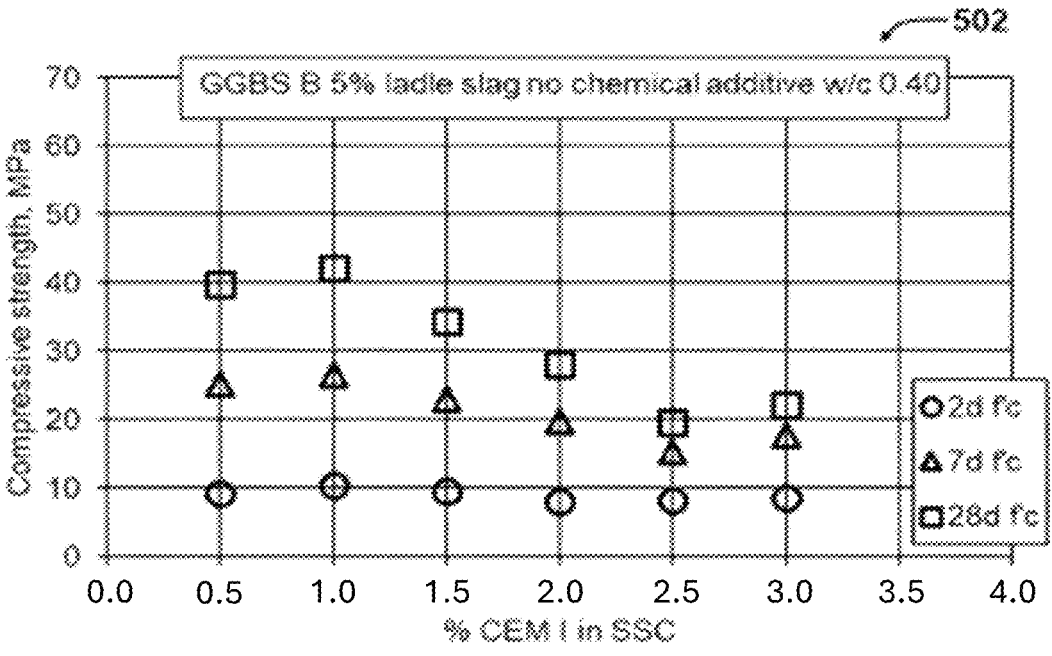
FIG. 5 shows trial results of optimization of SSC formulation incorporating Portland cement and a ladle slag, relative to compressive strength.
Figure 5:
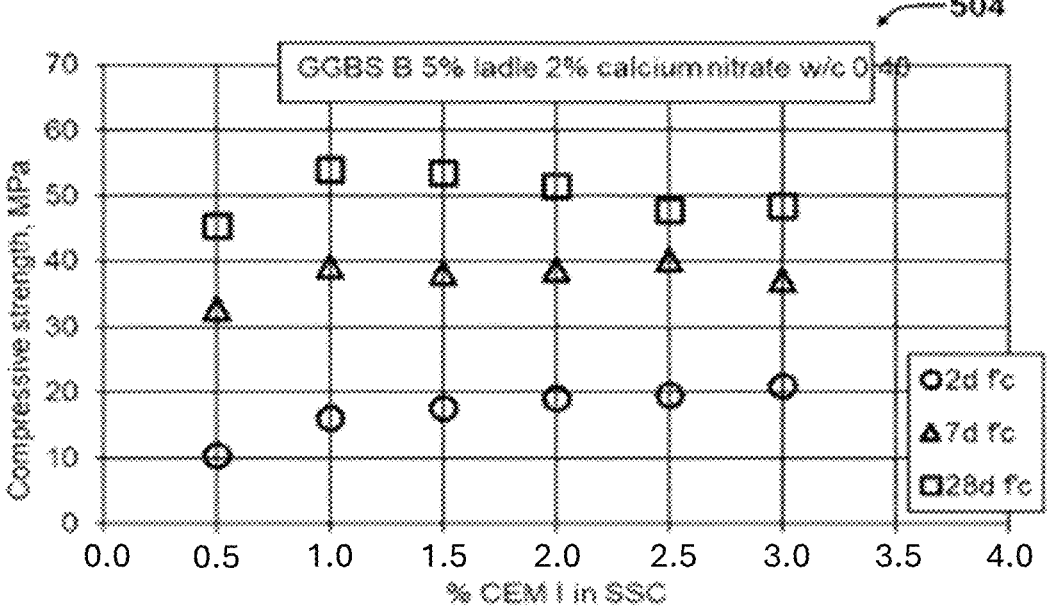
Figure 6:
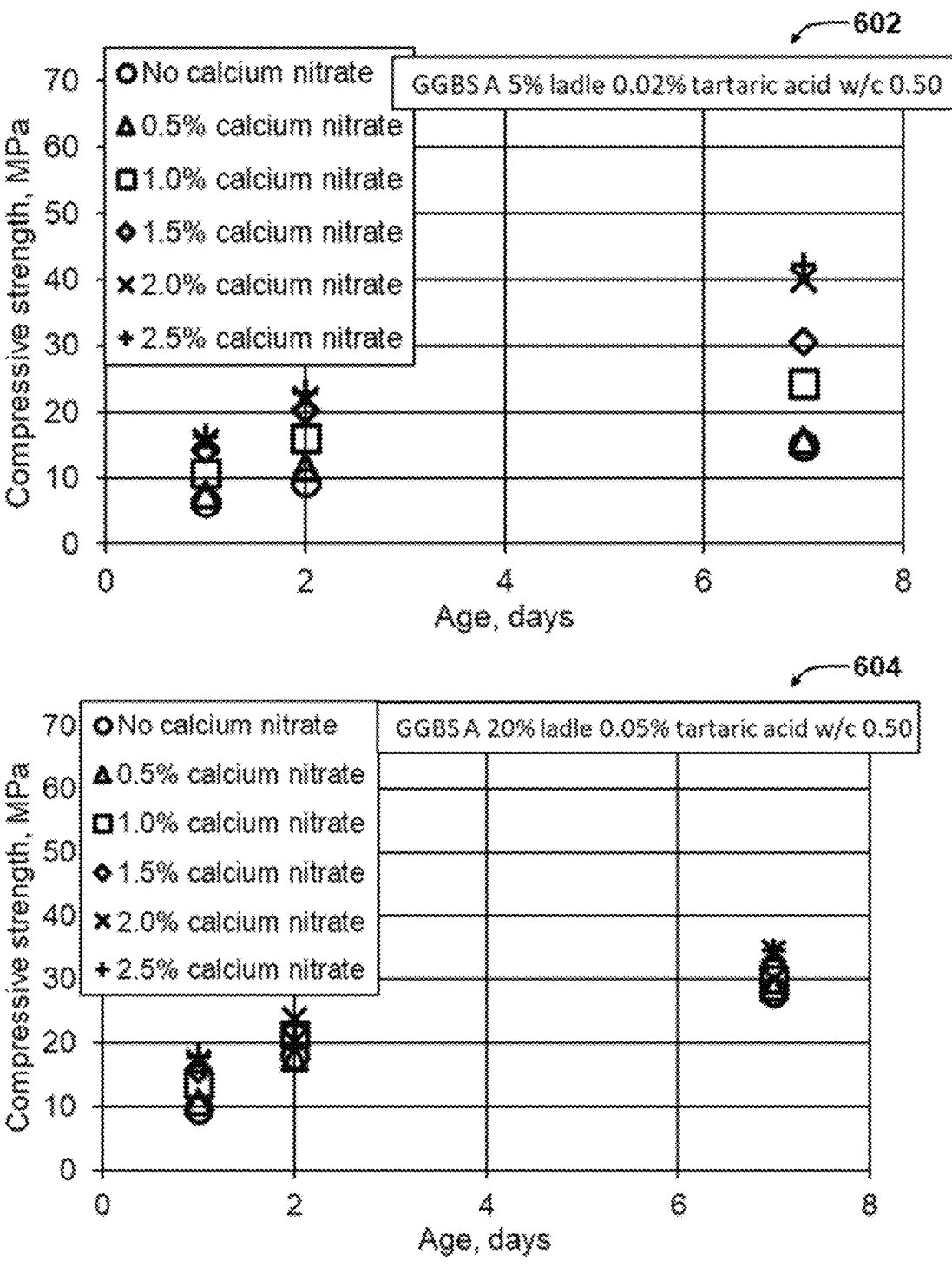
FIG. 6 shows the effect on compressive strength of optimization of calcium nitrate addition with different amounts of hydraulic activator.
Figure 7:
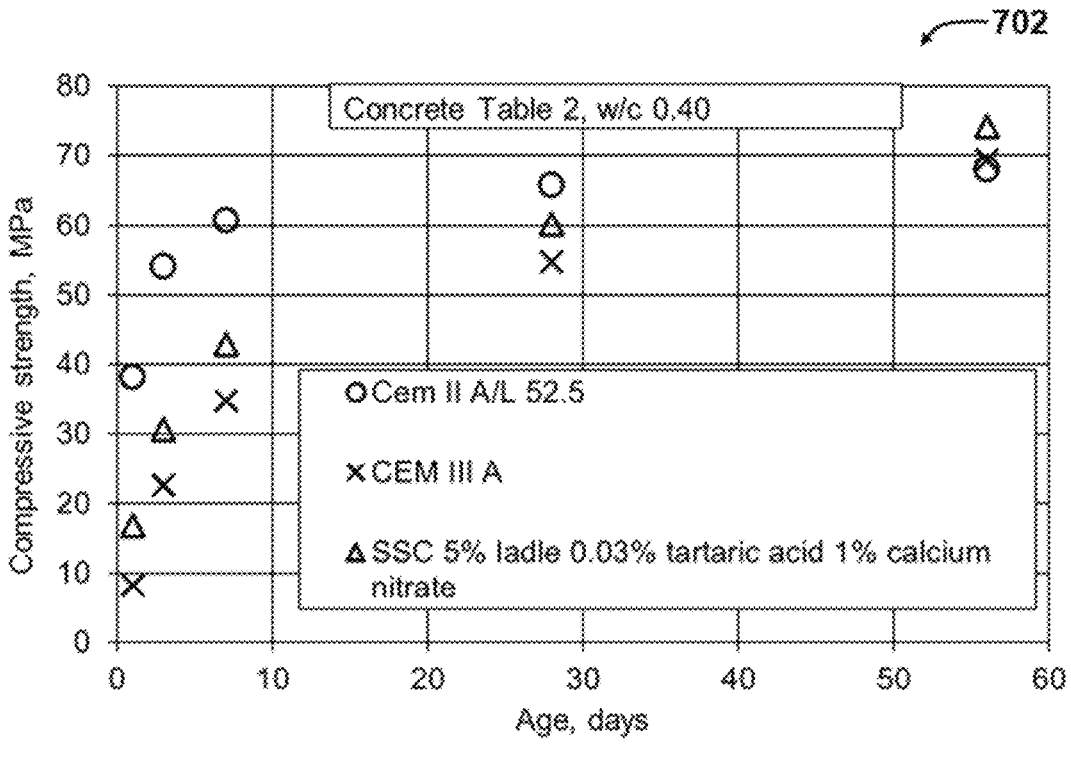
FIG. 7 shows trials results of different concrete formulations, relative to compressive strength.

Exemplary results of various formulations of supersulfated cementitious materials formed via methods and processes described above, with reference to FIGS. 1 and 2, are depicted in FIGS. 3-7. Formulations including different raw materials, raw material supply, and proportions of raw material types were tested by comparing a compressive strength of the resulting supersulfated cementitious materials and concrete mixtures incorporating the resulting SSCs. For example, optimization based on Portland cement content is shown in FIG. 3, optimization based on Arvedi ladle slag is shown in FIG. 4, optimization of a combination of Portland cement and Arvedi ladle slag is shown in FIG. 5, optimization of calcium nitrate as an additive is shown in FIG. 6, and trials comparing concrete formulations are shown in FIG. 7.

Figure 3A:
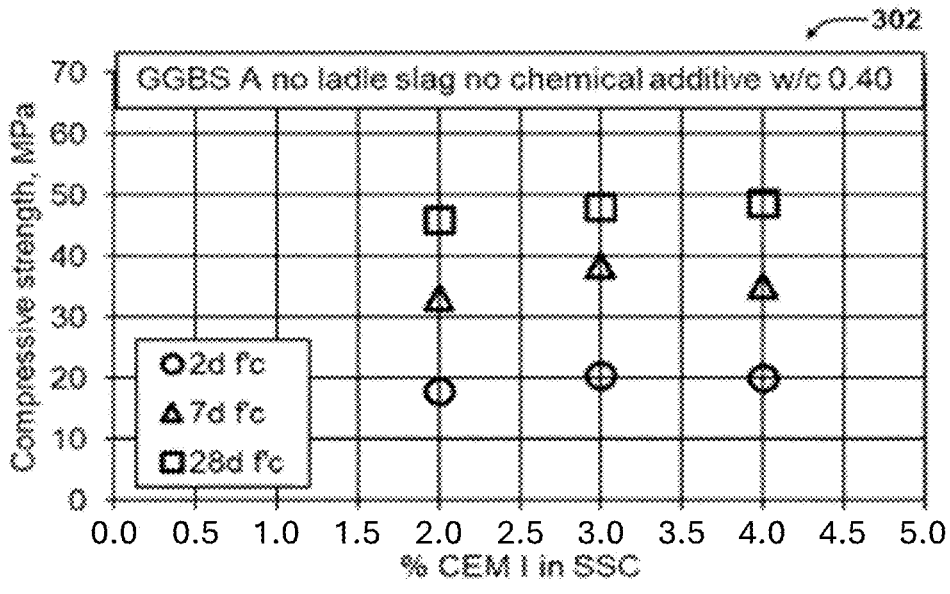
FIGS. 3a to 3b show trial results of optimization of calcium nitrate addition to Portland cement, relative to compressive strength.
Figure 3A:
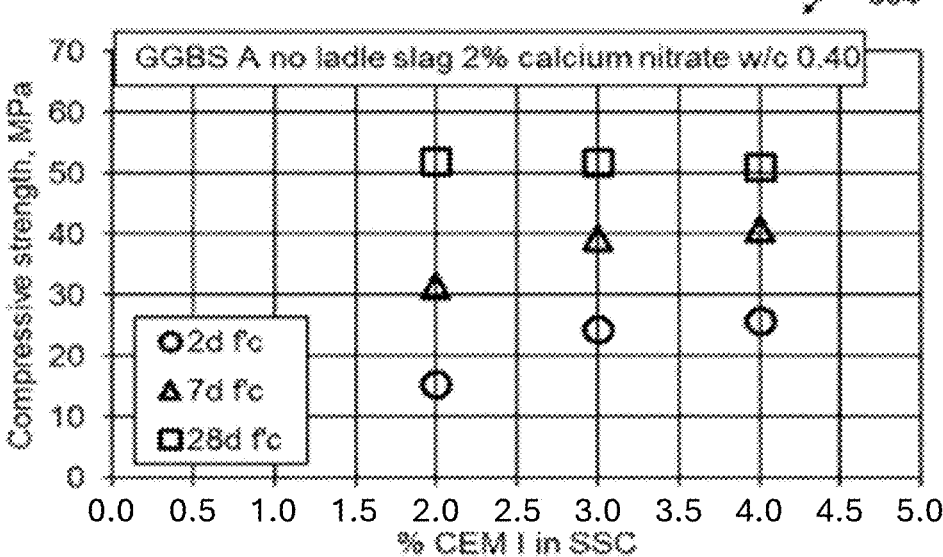
Figure 3B:
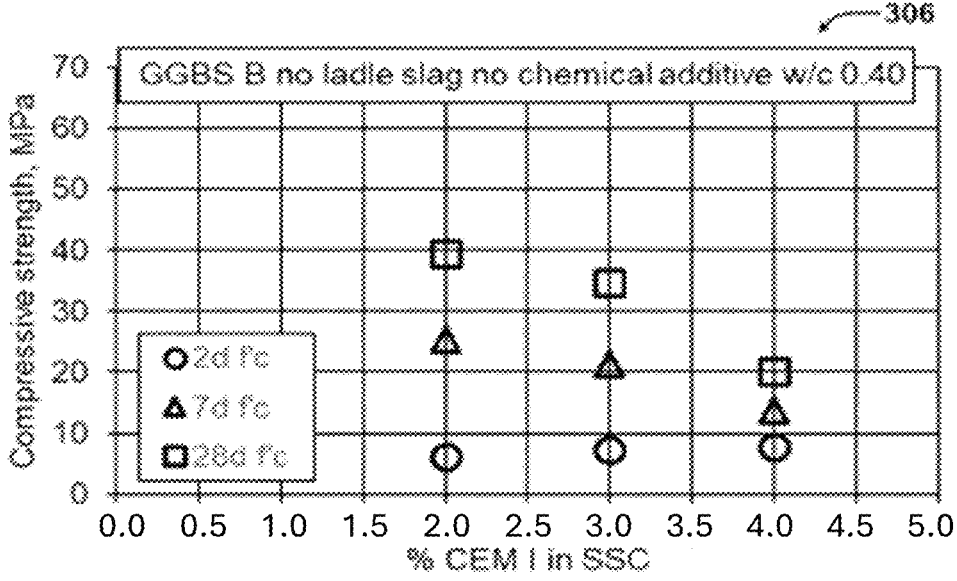
Figure 3B:
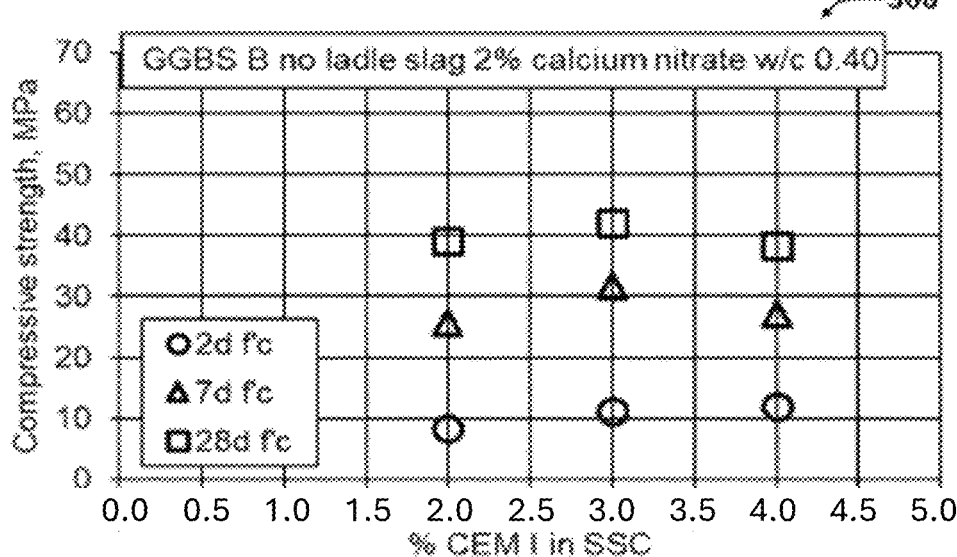

A set of results illustrated in FIG. 3 includes a FIG. 3a showing first graph 302 (GGBS "A", no ladle slag, no chemical additive, w/c 0.40), and a second graph 304 (GGBS "A", no ladle slag, 2% calcium nitrate, w/c 0.40); and a FIG. 3b showing a third graph 306 (GGBS "B", no ladle slag, no chemical additive, w/c 0.40), and a fourth graph 308 (GGBS "B", no ladle slag, 2% calcium nitrate, w/c 0.40). The graphs show the effect of different compositions of Portland cement (% CEM I in SSC) with different quantities of calcium nitrate added as an activator or accelerator. Based on the results, calcium nitrate may accelerate at all aging times tested and may reduce incompatibility between the Portland cement and other constituents of the SSC.

A set of results illustrated in FIG. 4 includes a FIG. 4a showing a first graph 402 (GGBS "B" and ladle slag, no CEM I, no chemical additive, w/c 0.40; control with no ladle slag (0%) has 3% CEM I activator), and a second graph 404 (GGBS "B" and ladle slag, no CEM I, 2% calcium nitrate, w/c 0.40); a FIG. 4b showing and a third graph 406 (GGBS "A", no chemical additive, w/c 0.40), and a fourth graph 408 (GGBS "A", 2% calcium nitrate, w/c 0.40); and a FIG. 4c showing fifth graph 410 (GGBS "B", no chemical additive, in at least one embodiment, may completely replace Portland cement. Retarders, as described previously, are included to mitigate flash set and support dispersing admixtures. The set of results in FIGS. 4a, 4b, and 4c indicate that a combination of the Arvedi ladle slag and calcium nitrate may be effective for less reactive GGBF slags. This may allow GGBF slag with <13% by weight of $Al_2O_3$ to be used, which may otherwise be insufficiently reactive to be used in a SSC.

A set of results illustrated in FIG. 5 includes a first graph 502 (GGBS "B", 5% ladle slag, no chemical additive, w/c 0.40) and a second graph 504 (GGBS "B", 5% ladle, 2% calcium nitrate, w/c 0.40). The graphs depict an effect of different combinations of Portland cement content and Arvedi ladle slag content on compressive strength of resulting SSCs. The results show that a maximum content of Arvedi ladle slag of 5% by weight (according to harmonized European standard EN15743) with calcium nitrate enhances the compressive strength of the SSCs formulated with Portland cement. The calcium nitrate may also mitigate a sensitivity to Portland cement overdose to which SSCs may be prone.

A set of results depicted in FIG. 6 includes a first graph 602 (GGBS "A", 5% ladle, 0.02% tartaric acid, w/c 0.50), and a second graph 604 (GGBS "A", 20% ladle, 0.05% tartaric acid, w/c 0.50). The graphs demonstrate the optimization of calcium nitrate content at different proportions of ladle slag in the SSC mixture. Techniques to optimize calcium nitrate content in SSC formulations may be applied to various types of GGBF slags, including SSAB Raahe/Oxelosund, as well as specialty formulations for LKAB and Trafikverket for soil stabilization.

In at least one embodiment, the calcium nitrate may be added during blending of already ground materials. However, in some instances, this may not be practical due to the hydroscopic and viscid properties of calcium nitrite. In at least one embodiment, adding a pre-blended mixture of calcium nitrate and ground calcium sulfate, limestone or other suitable carriers to a ground mixture after the ground mixture leaves a separator after classification, however, may alleviate issues with decomposition during grinding.

A set of results illustrated in FIG. 7 includes a first graph 702 (Concrete Table 2, w/c 0.40). The graph 702 shows results of concrete trials with concrete mixtures having the same mixture design and cement content as detailed in Table 2, incorporating a SSC formed using the methods and process described herein, and compared to concrete mixtures incorporating a rapid hardening CEM II A/L portland limestone cement, and a CEM III A slag cement commonly used for low carbon concrete. The results show that the concrete mixture with the SSC outperforms the concrete mixture with the CEM III A/L cement after 56 days curing time, and the concrete mixture with the CEM III A at all curing ages.

Figure 8:
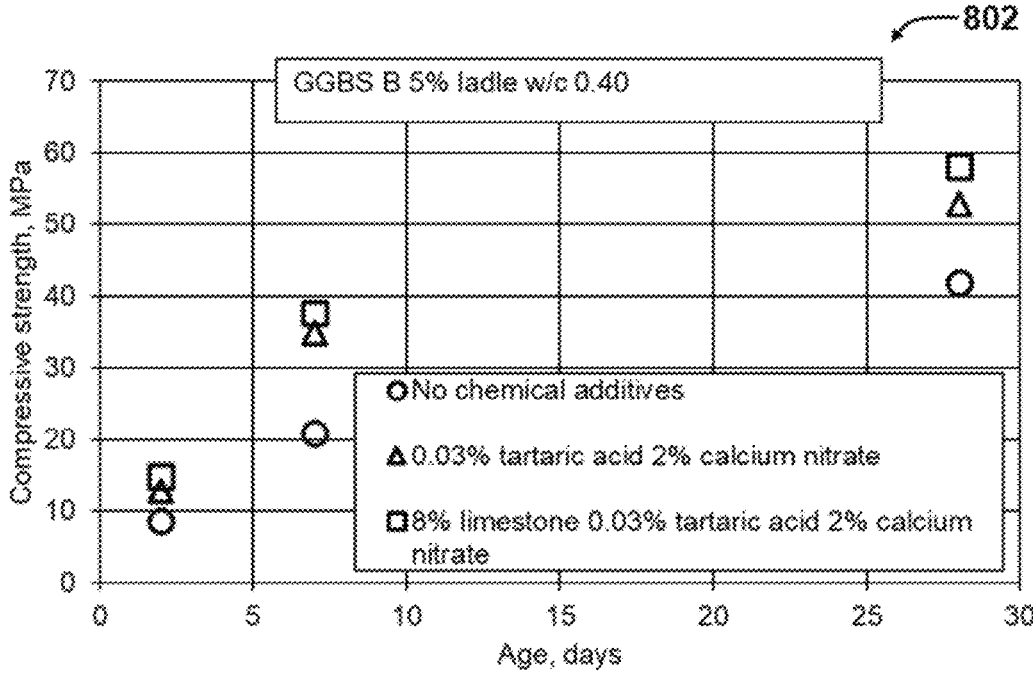
FIG. 8 shows trial results of SSC formulations incorporating different chemical additive combinations, relative to compressive strength.

A set of results illustrated in FIG. 8 includes a time-series graph 802 (GGBS "B", 5% ladle, w/c 0.40). The graph 802 shows the effect of chemical additives and limestone content on compressive strength development. The graph depicts how combinations of tartaric acid, calcium nitrate, and limestone influence strength development in GGBS mixtures containing 5% ladle slag. This suggests that limestone, when used in conjunction with chemical additives, can effectively enhance the mechanical performance of GGBS-based mixtures.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, Band C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A supersulfated cementitious material, comprising:
i) at least 1 wt % of a hydraulic activator comprising calcium (Ca) and aluminum (Al), wherein:
the calcium content, expressed as CaO equivalent, is at least 20 wt %; and
the aluminum content, expressed as $Al_2O_3$ equivalent, is at least 15 wt %;
ii) one or more sulfates;
iii) granulated blast furnace slag;
iv) tartaric acid in the range of 0.005 wt % to 0.5 wt %; and
v) calcium nitrate in the range of 1 wt % to 2 wt %.

2. The supersulfated cementitious material according to claim 1, wherein the supersulfated cementitious material comprises tartaric acid in the range of 0.02 wt % to 0.35 wt %.

3. The supersulfated cementitious material according to claim 1, wherein the supersulfated cementitious material comprises at least 1 wt % of calcium nitrate.

4. The supersulfated cementitious material according to claim 1, wherein the hydraulic activator is selected from the group consisting of: a ladle slag, an amorphous alumina slag, a Belite-Ye'elimite-Ferrite (BYF) clinker, and a combination thereof.

5. The supersulfated cementitious material according to claim 1, wherein the supersulfated cementitious material comprises at least 5 wt % of the hydraulic activator.

6. The supersulfated cementitious material according to claim 1, wherein the supersulfated cementitious material comprises at least 10 wt % of calcium sulfate.

7. The supersulfated cementitious material according to claim 1, wherein the supersulfated cementitious material comprises at least 15 wt % of calcium sulfate.

8. The supersulfated cementitious material according to claim 1, wherein the supersulfated cementitious material comprises 82 wt % or less of the granulated blast furnace slag.

9. The supersulfated cementitious material according to claim 1, wherein the granulated blast furnace slag has a Blaine fineness of at least 400 $m^2$/kg.

10. The supersulfated cementitious material according to claim 1, wherein the supersulfated cementitious material comprises 3 wt % or less of Portland cement clinker.

11. A cement mortar comprising a supersulfated cementitious material and an aggregate, wherein the supersulfated cementitious material comprises:
i) at least 5 wt % of a hydraulic activator comprising calcium (Ca) and aluminum (Al), wherein:
the hydraulic activator comprises ladle slag;
the calcium content, expressed as CaO equivalent, is at least 20 wt %; and
the aluminum content, expressed as $Al_2O_3$ equivalent, is at least 15 wt %;
ii) at least 10 wt % of calcium sulfate;
iii) 82 wt % or less of granulated blast furnace slag, said granulated blast furnace slag having a Blaine fineness of at least 400 $m^2$/kg;
iv) 3 wt % or less of Portland cement clinker;
v) tartaric acid in the range of 0.005 wt % to 0.5 wt %; and
vi) calcium nitrate in the range of 0.5 wt % to 3 wt %,
wherein at least 5 wt % of the supersulfated cementitious material is comprised of the ladle slag.

12. The cement mortar according to claim 11, wherein the aggregate comprises sand.

13. The cement mortar according to claim 11, wherein the cement mortar has a water-to-cementitious material ratio of 0.40 by weight.

14. The cement mortar according to claim 11, wherein the hydraulic activator further comprises one or more of an amorphous alumina slag and a Belite-Ye'elimite-Ferrite (BYF) clinker.

15. The cement mortar according to claim 11, wherein the supersulfated cementitious material comprises tartaric acid in the range of 0.02 wt % to 0.35 wt %.

16. The cement mortar according to claim 11, wherein the supersulfated cementitious material comprises at least 1 wt % of calcium nitrate.

17. The cement mortar according to claim 11, wherein the cement mortar further comprises one or more materials selected from the group consisting of: quicklime (CaO), fly ash, limestone, their derivatives, and combinations thereof.

18. The cement mortar according to claim 11, wherein the cement mortar exhibits a compressive strength of at least 30 MPa at 7 days from onset of hardening.

19. The cement mortar according to claim 11, wherein the cement mortar exhibits a compressive strength of at least 50 MPa at 28 days from onset of hardening.

20. The supersulfated cementitious material according to claim 1, wherein the supersulfated cementitious material comprises tartaric acid in the range of 0.03 wt % to 0.2 wt %.

21. The supersulfated cementitious material according to claim 20, wherein the supersulfated cementitious material exhibits a compressive strength of at least 50 MPa at 28 days from onset of hardening.

22. The supersulfated cementitious material according to claim 1, wherein the supersulfated cementitious material comprises at least 5 wt % of the hydraulic activator, and wherein the hydraulic activator comprises ladle slag.

23. A cement mortar comprising a supersulfated cementitious material and an aggregate, wherein the supersulfated cementitious material comprises:

i) at least 1 wt % of a hydraulic activator comprising calcium (Ca) and aluminum (Al), wherein:

the calcium content, expressed as CaO equivalent, is at least 20 wt %; and the aluminum content, expressed as $Al_2O_3$ equivalent, is at least 15 wt %;

ii) at least 10 wt % of calcium sulfate;

iii) 82 wt % or less of granulated blast furnace slag, said granulated blast furnace slag having a Blaine fineness of at least 400 $m^2$/kg;

iv) 3 wt % or less of Portland cement clinker;

v) tartaric acid in the range of 0.005 wt % to 0.5 wt %; and vi) calcium nitrate in the range of 1 wt % to 2 wt %.

* * * * *